United States Patent
Powell et al.

(10) Patent No.: US 12,206,734 B2
(45) Date of Patent: Jan. 21, 2025

(54) SYNCHRONOUS REPLICATION FOR STORAGE

(71) Applicant: NetApp Inc., San Jose, CA (US)

(72) Inventors: Paul Anthony Powell, Holly Springs, NC (US); Akhil Kaushik, San Jose, CA (US); Srikumar Natarajan, Cary, NC (US); Ching-Yuk Paul Ngan, Redwood City, CA (US)

(73) Assignee: NetApp, Inc., San Jose, CA (US)

( * ) Notice: Subject to any disclaimer, the term of this patent is extended or adjusted under 35 U.S.C. 154(b) by 386 days.

(21) Appl. No.: 17/567,182

(22) Filed: Jan. 3, 2022

(65) Prior Publication Data

US 2022/0124149 A1 Apr. 21, 2022

Related U.S. Application Data

(63) Continuation of application No. 16/682,056, filed on Nov. 13, 2019, now Pat. No. 11,218,539, which is a (Continued)

(51) Int. Cl.
*G06F 3/00* (2006.01)
*G06F 3/06* (2006.01)
(Continued)

(52) U.S. Cl.
CPC ............ *H04L 67/1095* (2013.01); *G06F 3/06* (2013.01); *G06F 3/0614* (2013.01); *G06F 3/065* (2013.01);
(Continued)

(58) Field of Classification Search
None
See application file for complete search history.

(56) References Cited

U.S. PATENT DOCUMENTS

| 7,406,487 B1 | 7/2008 | Gupta et al. |
| 8,868,874 B2 | 10/2014 | Wilkinson |

(Continued)

FOREIGN PATENT DOCUMENTS

CN 108604164 A * 9/2018 .......... G06F 11/2064

OTHER PUBLICATIONS

International Search Report and Written Opinion for Application No. PCT/US2016/063305 mailed Mar. 2, 2017, 12 pages.

*Primary Examiner* — Midys Rojas
(74) *Attorney, Agent, or Firm* — Cooper Legal Group, LLC

(57) ABSTRACT

One or more techniques and/or computing devices are provided for implementing synchronous replication. For example, a synchronous replication relationship may be established between a first storage controller hosting local storage and a second storage controller hosting remote storage (e.g., replication may be specified at a file, logical unit number (LUN), or any other level of granularity). Data operations and offloaded operations may be implemented in parallel upon the local storage and the remote storage. Error handling operations may be implemented upon the local storage and implement in parallel as a best effort on the remote storage, and a reconciliation may be performed to identify any data divergence from the best effort parallel implementation. Storage area network (SAN) operations may be implemented upon the local storage, and upon local completion may be remotely implemented upon the remote storage.

20 Claims, 20 Drawing Sheets

Related U.S. Application Data continuation of application No. 15/850,754, filed on Dec. 21, 2017, now Pat. No. 10,523,751, which is a continuation of application No. 14/953,048, filed on Nov. 27, 2015, now Pat. No. 9,917,896.

(51) Int. Cl.
*G06F 11/20* (2006.01)
*G06F 16/178* (2019.01)
*G06F 16/182* (2019.01)
*H04L 67/1095* (2022.01)
*H04L 67/1097* (2022.01)

(52) U.S. Cl.
CPC .......... *G06F 3/067* (2013.01); *G06F 11/2064* (2013.01); *G06F 11/2069* (2013.01); *G06F 11/2076* (2013.01); *G06F 16/178* (2019.01); *G06F 16/1844* (2019.01); *H04L 67/1097* (2013.01); *G06F 2201/805* (2013.01)

(56) References Cited

U.S. PATENT DOCUMENTS

| | | | |
|---|---|---|---|
| 9,047,189 | B1 | 6/2015 | Gupta et al. |
| 9,307,011 | B2 | 4/2016 | Keremane et al. |
| 9,378,219 | B1 | 6/2016 | Bono et al. |
| 9,521,198 | B1 | 12/2016 | Agarwala et al. |
| 9,880,777 | B1 | 1/2018 | Bono et al. |
| 9,917,896 | B2 | 3/2018 | Powell et al. |
| 10,318,491 | B1 | 6/2019 | Graham et al. |
| 10,523,751 | B2 | 12/2019 | Powell et al. |
| 11,218,539 | B2 | 1/2022 | Powell et al. |
| 2004/0039888 | A1 | 2/2004 | Lecrone et al. |
| 2005/0193272 | A1 | 9/2005 | Stager et al. |
| 2007/0239944 | A1 | 10/2007 | Rupanagunta et al. |
| 2010/0082700 | A1 | 4/2010 | Parab |
| 2010/0250867 | A1 | 9/2010 | Bettger et al. |
| 2011/0145517 | A1 | 6/2011 | Bish et al. |
| 2013/0073519 | A1 | 3/2013 | Lewis et al. |
| 2013/0198133 | A1 | 8/2013 | Lee et al. |
| 2014/0068233 | A1 | 3/2014 | Ueda et al. |
| 2014/0082414 | A1 | 3/2014 | Olster |
| 2014/0172930 | A1 | 6/2014 | Molaro et al. |
| 2014/0214772 | A1 | 7/2014 | Kadayam et al. |
| 2014/0298078 | A1* | 10/2014 | Keremane ........... G06F 11/2058 709/201 |
| 2015/0161184 | A1 | 6/2015 | Patiejunas et al. |
| 2015/0229775 | A1 | 8/2015 | Kamboh et al. |
| 2016/0147805 | A1 | 5/2016 | Benke et al. |
| 2016/0306822 | A1 | 10/2016 | Waghulde |
| 2017/0054802 | A1 | 2/2017 | Annamalai et al. |
| 2017/0147601 | A1 | 5/2017 | Kaushik et al. |
| 2020/0084271 | A1* | 3/2020 | Powell ................ H04L 67/1095 |

* cited by examiner

SYNCHRONOUS REPLICATION FOR STORAGE

RELATED APPLICATION

This application claims priority to and is a continuation of U.S. patent application Ser. No. 16/682,056, filed on Nov. 13, 2019 and titled "SYNCHRONOUS REPLICATION FOR STORAGE AREA NETWORK PROTOCOL STORAGE," which claims priority to and is a continuation of U.S. Pat. No. 10,523,751, filed on Dec. 21, 2017 and titled "SYNCHRONOUS REPLICATION FOR STORAGE AREA NETWORK PROTOCOL STORAGE," which claims priority to and is a continuation of U.S. Pat. No. 9,917,896, filed on Nov. 27, 2015 and titled "SYNCHRONOUS REPLICATION FOR STORAGE AREA NETWORK PROTOCOL STORAGE," which are incorporated herein by reference.

BACKGROUND

A storage environment may provide clients with access to data using storage area network (SAN) protocols, such as through Small Computer System Interface (SCSI), internet SCSI (iSCIS), Fiber Channel Protocol (FCP), etc. In an example, the storage environment may comprise one or more storage controllers configured to provide clients with access to data within storage devices owned by such storage controllers. For example, a first storage controller may provide clients with access to data within a first storage device. A second storage controller may provide clients with access to data within a second storage device.

A synchronous replication relationship may be established between the first storage controller and the second storage controller, which may improve data loss protection and mitigate client interruptions of service in the event a storage controller and/or storage device fails or becomes unavailable. For example, data may be replicated from the first storage device to a secondary storage device (e.g., replicated to a storage device accessible to the second storage controller but initially owned by the first storage controller) so that the second storage controller may provide clients with failover access to replicated data within the secondary storage device in the event the first storage controller fails. In an example of synchronous replication, a write request, targeting the first storage device, may be split into a local write request that is to be performed upon the first storage device and a remote write request that it to be performed upon the secondary storage device (e.g., the local write request may be performed first upon the first storage device, and upon completion of the local write request, the remote write request may be performed upon the second storage device). Once both the local write request and the remote write request are complete, a write request complete notification may be provided back to a client that issued the write request. In an example, the local write request and the remote write request may be performed in parallel. Unfortunately, synchronous replication may be implemented within a file system, and thus changes to the file system may render the synchronous replication inoperable. Additionally, synchronous replication may be merely available at a coarse level of granularity, such as a volume level or storage controller level, and thus resources that may otherwise be used for storage operations and client data access may be undesirably consumed by overhead associated with coarse grain synchronous replication (e.g., a volume may comprise some files that a client wants replicated and other files for which the client is not interested in replication, but volume level replication may replicate all files of the volume).

DETAILED DESCRIPTION

Figure 1:
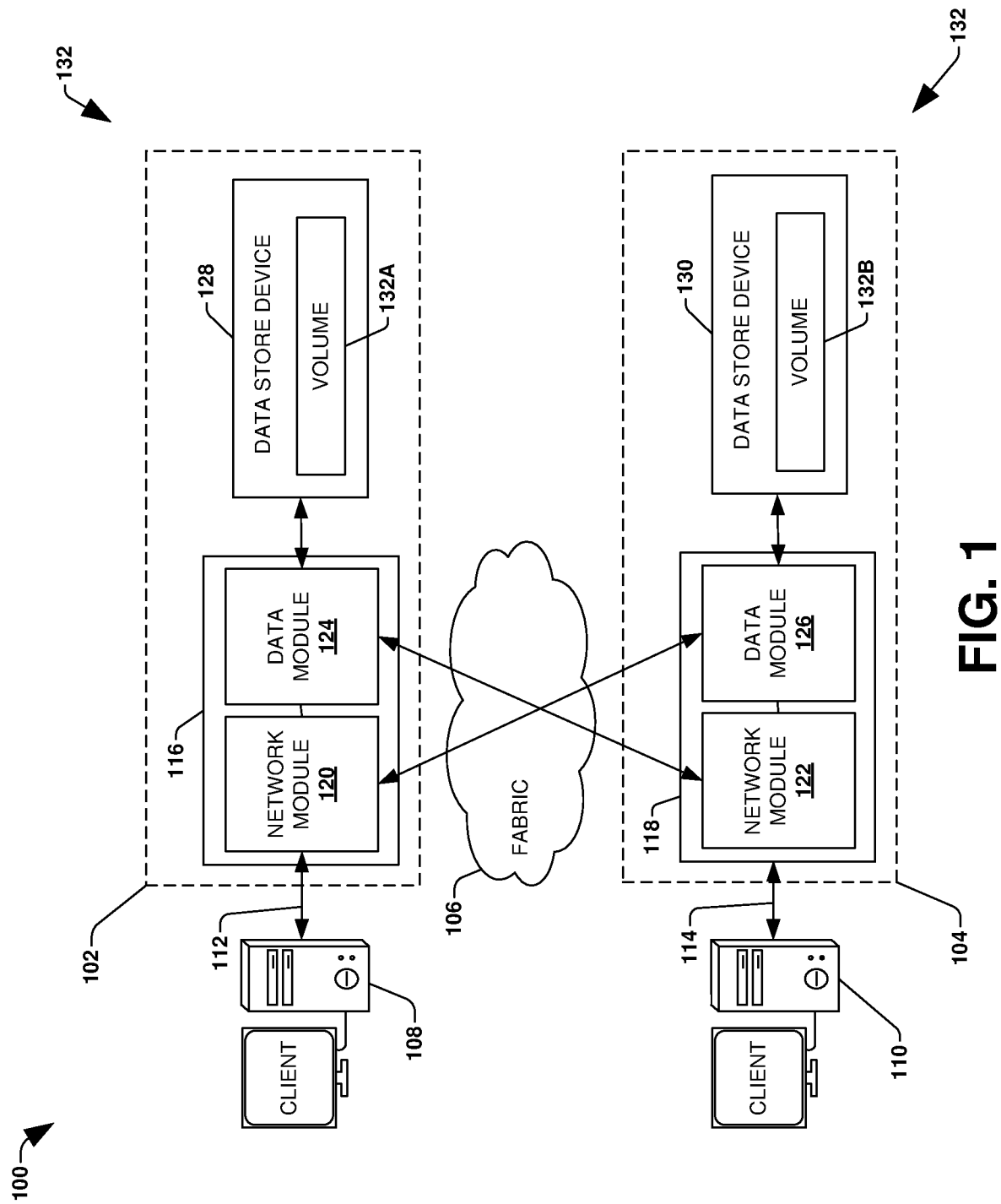
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for synchronous replication are provided. Synchronous replication may be provided for storage accessible through a storage area network (SAN) protocol, such as using SCSI, iSCSI, FCP, etc. The synchronous replication may be provided above a file system such that operations (e.g., inband SCSI ops such as write, unmap, copy offload, etc.; out-of-band metadata ops such as logical unit number (LUN) modify, resize, etc.) may be intercepted before reaching the file system, and thus synchronous replication may be unaffected by changes to the file system (e.g., a file system upgrade, a change from a first file system to a second file system, etc.) and/or may be file system agnostic (e.g., synchronous replication functionality may be compatible with various types of file systems).

The synchronous replication may be provided at a relatively finer level of granularity, such as for a single file, LUN, or a consistency group of files or LUNs, which may reduce processing resources and network bandwidth otherwise wasted on relatively coarser grain synchronization that synchronizes more files, LUNs, or data than desired (e.g., a volume level synchronization may replicate all files of a volume regardless of whether the volume comprises some files for which replication is not needed). It may be appreciated that in one example where synchronous replication is implement for the SAN protocol, replication may be provided at a LUN granularity. Synchronous replication may implement data operations (e.g., a write operation) in parallel, implement offloaded operations (e.g., a copy offload operation) in parallel with one another and serialized with inflight file operations, implement error handling operations (e.g., an abort task, a task set, a LUN reset, a target reset, etc.) on local storage and as a best effort on remote storage, and implement SAN control operations (e.g., a set LUN size, a space reservation, or other changes to storage object metadata) sequentially and serially for the same target storage object (e.g., serial implementation of 2 SAN control operations for the same LUN).

To provide context for synchronous replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), a logical connection, or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or first storage controller and node 118 may comprise a secondary or second storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol, or Storage Area Network (SAN) protocols, such as internet Small Computer System Interface (iSCSI) or Fibre Channel (FC) protocol, to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that implementing synchronous replication may be implemented within the clustered network environment 100. In an example, a synchronous replication relationship may be established between the node 116 (e.g., a first storage controller) and the node 118 (e.g., a second storage controller). In this way, data operations, offloaded operations, error handling operations, SAN control operations, and/or other operations and use cases (e.g., data access, control, and metadata; offloaded and/or error handling operations on various storage containers such as files, SAN Logical Units, or Objects) may be synchronized between the data storage device 128 of node 116 and the data storage device 130 of node 118 (e.g., synchronization at a file or LUN level of granularity). It may be appreciated that synchronous replication may be implemented for and/or between any type of computing environment, and may be transferrable between physical devices (e.g., node 116, node 118, etc.) and/or a cloud computing environment (e.g., remote to the clustered network environment 100).

Figure 2:
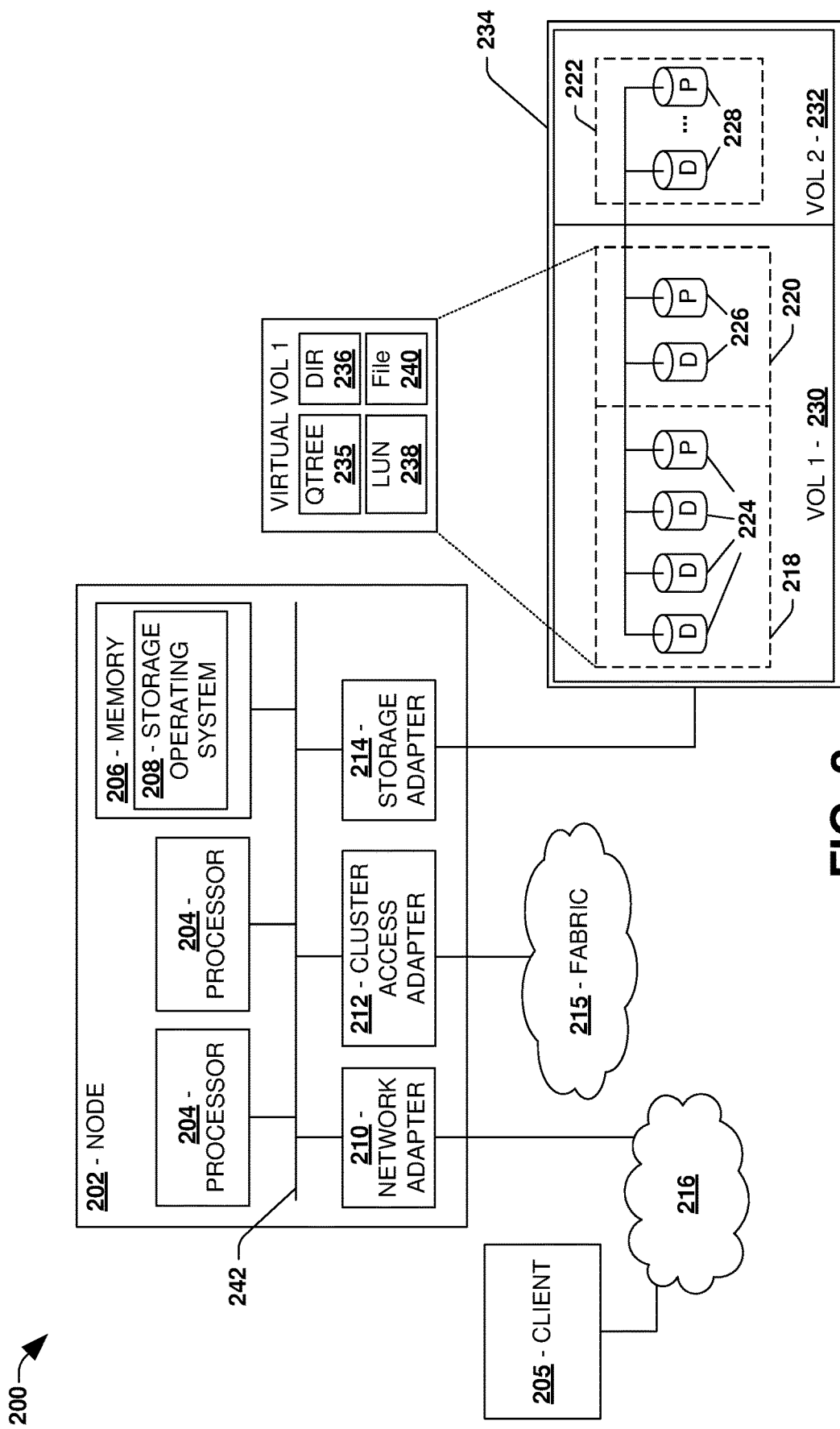
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other media capable of storing data (e.g., optical and tape media), including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) and/or non-RAID optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, a non-persistent namespace, or a non-hierarchical namespace, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228 and/or within non-block storage devices. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fibre Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, objects, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that implementing synchronous replication may be implemented for the data storage system 200. In an example, a synchronous replication relationship may be established between the node 202 (e.g., a first storage controller) and another node (e.g., a second storage controller). In this way, data operations, offloaded operations, error handling operations, SAN control operations, and/or other operations and use cases (e.g., data access, control, and metadata; offloaded and/or error handling operations on various storage containers such as files, SAN Logical Units, or Objects) may be synchronized between the node 202 and the other node (e.g., synchronization at a file or LUN level of granularity). It may be appreciated that synchronous replication may be implemented for and/or between any type of computing environment, and may be transferrable between physical devices (e.g., node 202, host device 205, etc.) and/or a cloud computing environment (e.g., remote to the node 202 and/or the host device 205).

Figure 3:
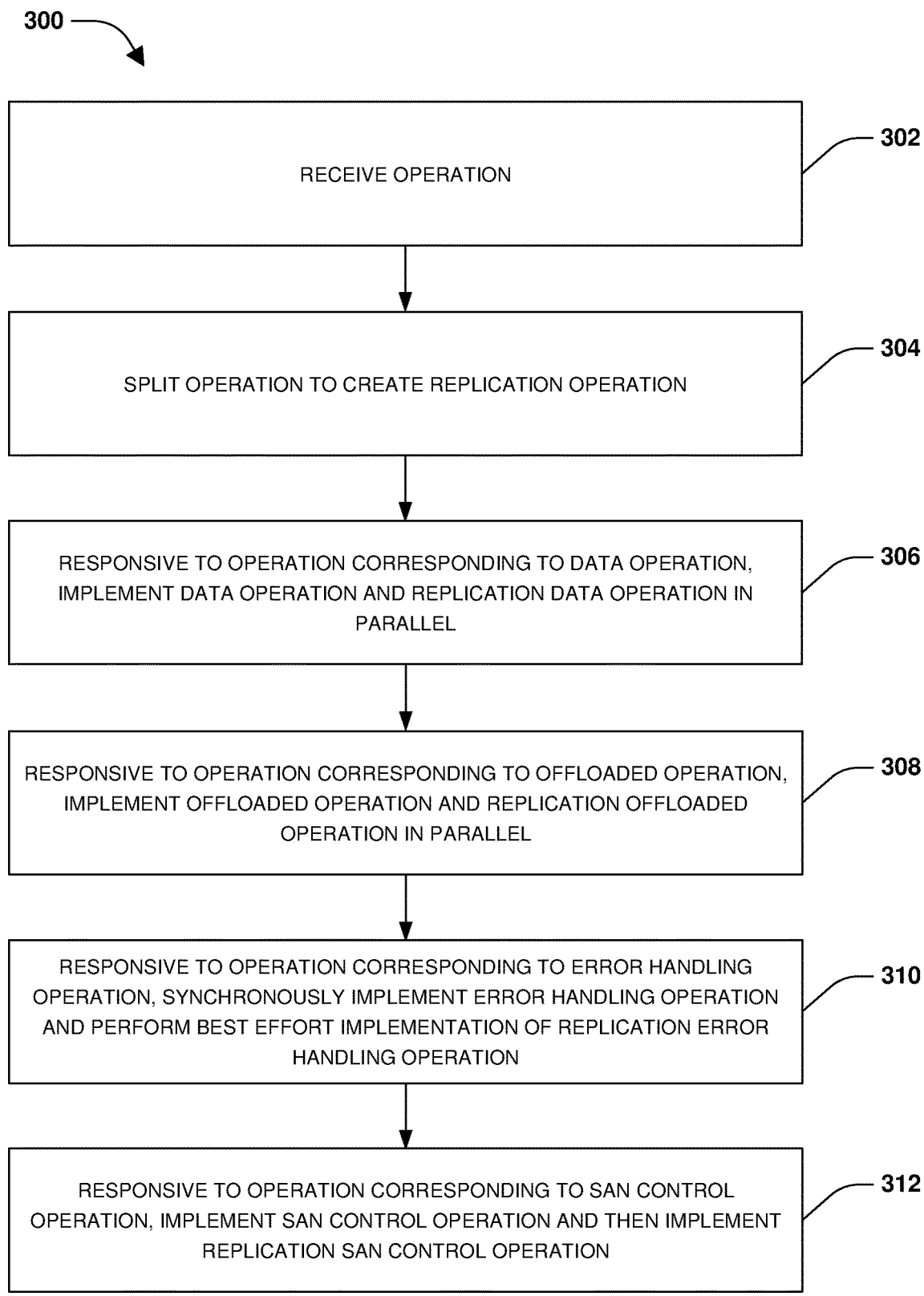
FIG. 3 is a flow chart illustrating an exemplary method of synchronous replication.

One embodiment of synchronous replication is illustrated by an exemplary method 300 of FIG. 3. A synchronous replication relationship may be established between a first storage controller hosting local storage and a second storage controller hosting remote storage. In an example, the first storage controller (e.g., hosted within a local network cluster) and the second storage controller (e.g., hosted within a remote network cluster) may be configured according to a disaster recovery relationship, such that a surviving storage controller may provide clients with failover access to replicated data associated with a failed storage controller (e.g., a switchover operation may be performed by the surviving storage controller in order to obtain ownership of storage comprising replicated data). The synchronous replication relationship may specify that operations directed to the first storage controller, such as data operations (e.g., a write operation), offloaded operations (e.g., a copy offload operation), error handling operations (e.g., an abort task, a task set, a LUN reset, a target reset, etc.), and/or SAN control operations (e.g., a modification to LUN metadata or other storage object metadata, such as a LUN size change or a LUN space reservation), for commitment to the local storage are to be synchronously replicated to the second storage controller, such as for commitment to the remote storage (e.g., commitment to both the local storage and the remote storage for synchronization before an operation complete notification is provided back to a host that issued the operation).

At 302, an operation for the local storage may be received. The operation may correspond to a storage area network (SAN) protocol. In an example, the operation may be intercepted before the operation is delivered to a file system (e.g., a network module may receive a host request, comprising the operation, from a host, and an interceptor may intercept the operation as the operation is being passed from the network module to a data module for implementation). A configuration cache may be evaluated to determine whether a target object of the operation is set for synchronous replication (e.g., the interceptor may query the configuration cache to determine whether a file, being written to by the operation, is set for synchronous replication because synchronous replication may be set at a file level granularity or any other level of granularity). At 304, the operation may be split to create a replication operation for the remote storage. For example, a splitter may split the operation responsive to the interceptor determining that the target object is set for synchronous replication. In an example, the operation may be split based upon the operation corresponding to a modification (e.g., a write operation, a change to metadata, etc.), which may improve efficiency by excluding the needless replication of read operations to the remote storage because such operations can be locally performed on the local storage.

At 306, responsive to the operation corresponding to a data operation and the replication operation corresponding to a replication data operation (e.g., the operation is a data operation such as a write operation), the data operation may be locally implemented upon the local storage in parallel with the replication data operation being remotely implemented upon the remote storage. Because a relatively larger number of data operations may be received and processed, data operations may be implemented in parallel (e.g., passed to the first storage controller for local commitment to the local storage and sent to the second storage controller for remote commitment regardless of whether the local commit has finished), which may improve client response time because the replication data operation may be sent to the second storage controller for commitment to the remote storage without first waiting for an acknowledgement that the data operation was successfully committed by the first storage controller to the local storage.

At 308, responsive to the operation corresponding to an offload operation and the replication operation corresponding to a replication offloaded operation, the offloaded operation may be locally implemented upon the local storage in parallel with the replication offloaded operation being remotely implemented upon the remote storage. In an example, a copy engine that will service the offloaded operation may be automatically selected based upon a replication relationship, such as the synchronous replication relationship, and thus a consistent service level may be provided where a time to complete the offloaded operation will take a similar amount of time to complete regardless of a state of the replication relationship. That is, an offloaded operation of type copy offload starts by selecting a copy engine based on a set of criteria. There is a hyper efficient copy engine called sis-clone which uses sharing of blocks and avoids read and write load. For synchronous replication this implementation makes a tradeoff where if the replication relationship is in the process of coming back InSync, a less efficient copy engine called 'block copy engine' is chosen, which adds reads and writes', and is a trade-off to prioritize establishing of a synchronous replication over efficiency of copy offload operation.

In an example, the offloaded operation may correspond to an operation, such as a copy offload operation, that is offloaded from an application server to a storage server so that the application server can conserve resources from doing read/write host-based copy operations and/or other operations that could be implemented by the storage server. In an example, the offloaded operation and/or the replication offloaded operation may be serialized to deterministically control the order of any overlapping inflight write operations. For example, an inflight write operation, overlapping a region targeted by the offloaded operation, may be identified (e.g., an inflight log may be consulted to identify a data operation as the inflight write operation). The inflight write operation may be queued until the offloaded operation and/or the replication offloaded operation are complete. In an example, overlapping inflight operations and offloaded operations, such as replication inflight operations, may be queued by the second storage controller, which may be beneficial for networks of higher latency. Responsive to receiving a completion notification for the offloaded operation and a remote completion notification for the replication offloaded operation, an operation complete notification may be sent to a host that submitted the operation.

At 310, responsive to the operation corresponding to an error handling operation and the replication operation corresponding to a replication error handling operation, the error handling operation may be synchronously implemented on the local storage. For example, the error handling operation may be implemented within a process flow that is different than a process flow of a failed data operation, which may reduce a likelihood that the error handling operation will also fail (e.g., an abort error handling operation may abort inflight writes, and thus is not processed as a regular data operation). The replication error handling operation may be performed as a best effort implementation on the remote storage, which may be performed in parallel with the implementation of the error handling operation. That is, the best effort implementation may indicate that success of the operation does not rely upon success of the replication error handing operation. That is, the error handling operation does not wait for completion of the replication error handling operation and success of the error handling operation is independent of a completion status of the replication error handling operation. For example, responsive to receiving a completion notification for the error handling operation, an operation complete notification may be sent to a host that submitted the error handling operation notwithstanding a status of the replication error handling operation, such as regardless of whether the replication error handling operation has completed, failed, or is still pending. In an example, the error handling operation may map to a set of data operations. The set of data operations may be grouped into an array that is sent to the remote storage for implementation, which may reduce network bandwidth and/or improve efficiency because a reduced number of messages are sent across a network to the remote storage.

In an example, a reconciliation between the local storage and the remote storage may be performed to address data divergence between the local storage and the remote storage. That is, because of parallel splitting of the error handling operation, an operation could complete on the local storage and abort at the remote storage or the operation could abort on the local storage and complete on the remote storage, thus resulting in divergence between the local storage and the remote storage. In an example, the reconciliation may be performed in-line with a current data operation. In an example of performing the reconciliation, a set of hash tables may be used to track inflight data operations, such as data operations. Operations may be tagged with identifiers associated with hash tables within the set of hash tables, such as where a data operation is tagged with an identifier of a hash table. In this way, the data operation, such as a write operation that was to be aborted by the error handling operation, and/or a replication of the data operation may be quickly identified by searching the hash table, identified by the identifier used to tag the data operation, for information used to perform the reconciliation (e.g., information regarding whether the data operation and/or the replication succeeded or failed; a local region within the local storage and a remote region within the remote storage that were targeted by the data operation and the replication, which may be evaluated for data consistency within the local region and the remote region; etc.).

At 312, responsive to the operation corresponding to storage area network (SAN) control operation (e.g., an operation used to modify storage object metadata, such as metadata of a LUN) and the replication operation corresponding to a replication SAN control operation, the SAN control operation may be implemented upon the local storage. In an example, the SAN control operation may be serially implemented with a second SAN control operation based upon the SAN control operation and the second SAN control operation targeting the same storage object (e.g., merely 1 SAN control operation may be implemented at any given time for a particular LUN). Responsive to receiving a completion notification for the SAN control operation, the replication SAN control operation may be implemented upon the remote storage (e.g., the replication SAN control operation may be refrained from being sent to the second storage controller until the completion notification is received because SAN control operations may be sequentially processed). Responsive to receiving the completion notification for the SAN control operation and a remote completion notification for the replication SAN control operation, an operation complete notification may be sent to a host that submitted the operation. In this way, synchronous replication may be implemented for various types of operations.

Figure 4A:
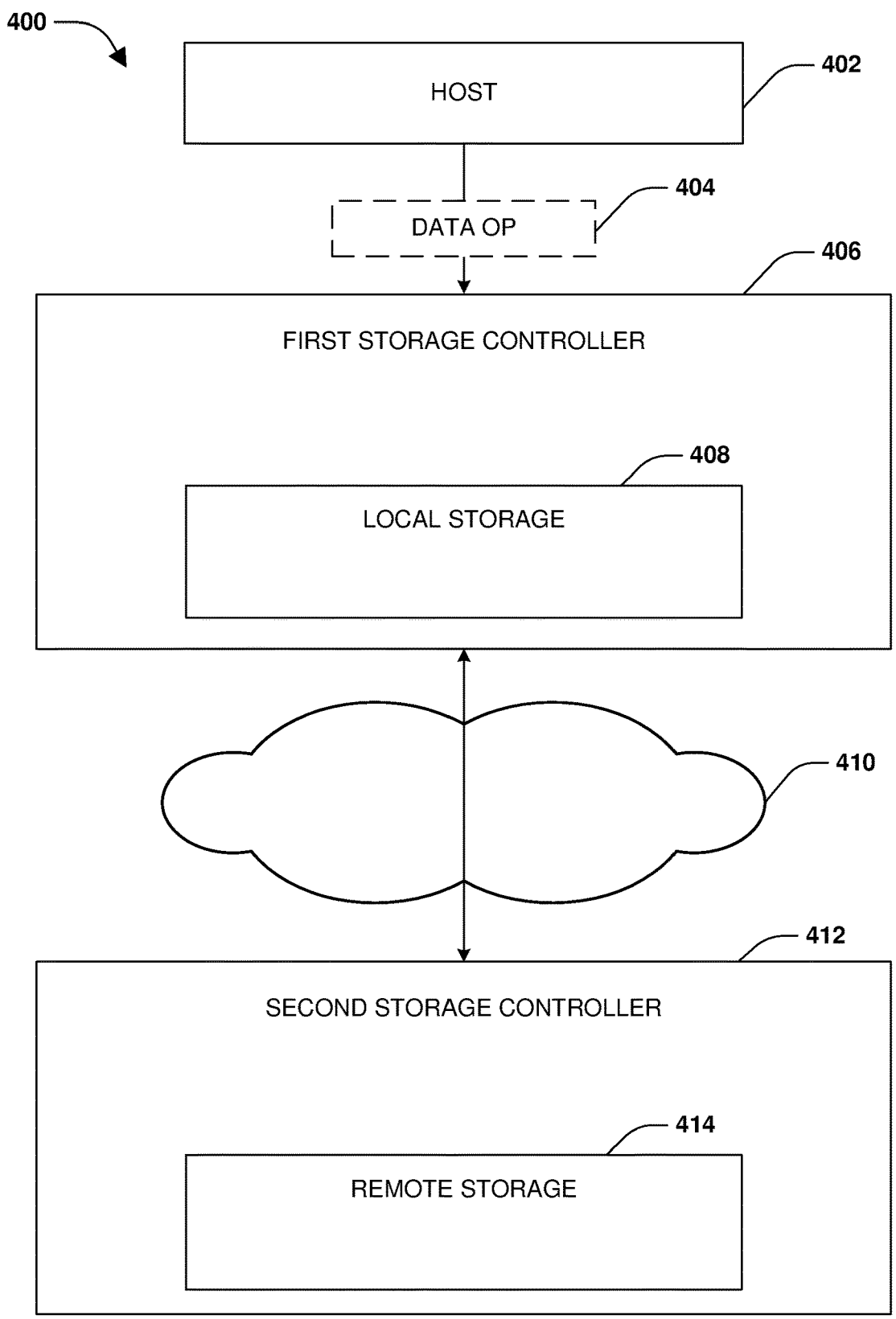
FIG. 4A is a component block diagram illustrating an exemplary computing device for synchronous replication, where a data operation is received.
Figure 4B:
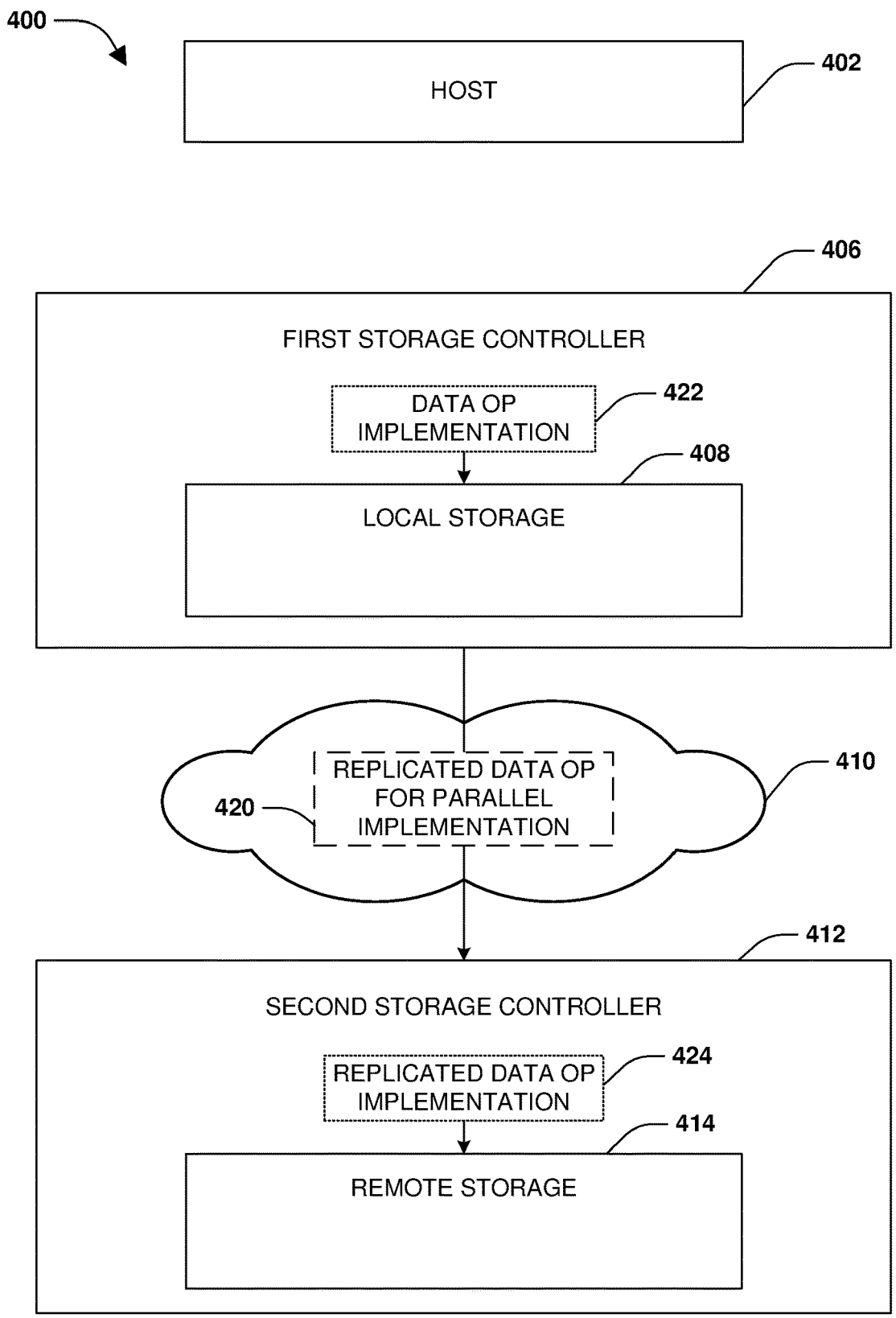
FIG. 4B is a component block diagram illustrating an exemplary computing device for synchronous replication, where a data operation is locally implemented and a replication data operation is remotely implemented in parallel.
Figure 4C:
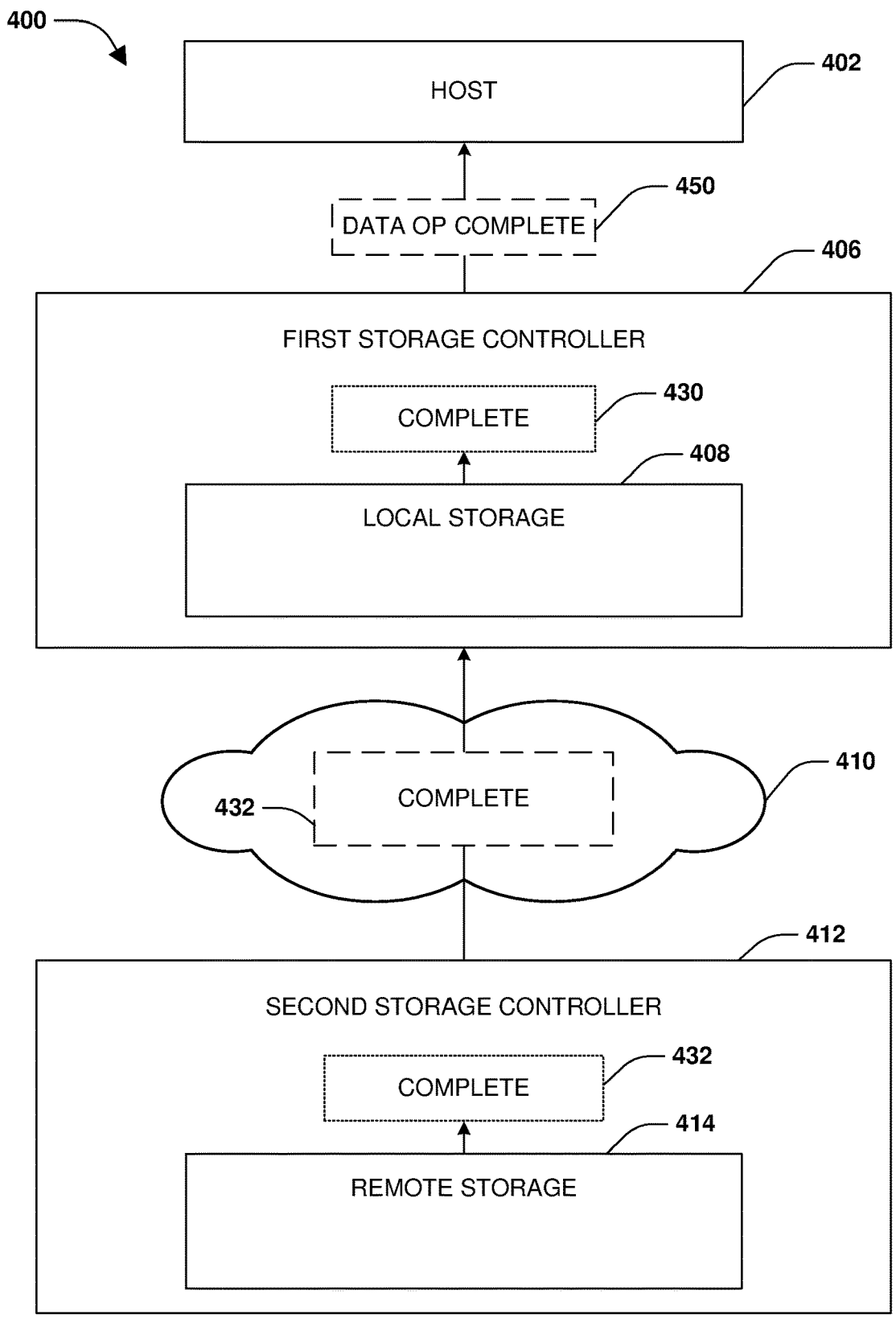
FIG. 4C is a component block diagram illustrating an exemplary computing device for synchronous replication, where a data operation complete notification is provided to a host.

FIGS. 4A-4C illustrate examples of a network storage environment for which synchronous replication may be implemented by a system 400. A first storage controller 406 (e.g., hosted within a first storage cluster located within a first building, city, or location) may be configured to provide a host 402, such as a client device, with access to data stored within local storage 408, as illustrated in FIG. 4A. The first storage controller 406 may be capable of communicating with a second storage controller 412 (e.g., hosted within a second storage cluster located within a second building, city, or location) over a network 410.

The first storage controller 406 and the second storage controller 412 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the first storage controller 406 and the second storage controller 412, such as between the local storage 408 and the remote storage 414. The synchronous replication relationship may specify that data operations, offloaded operations, error handling operations, storage area network (SAN) control operations, and/or other types of operations for the local storage 408 are to be implemented at both the local storage 408 and replicated to the remote storage 414 (e.g., such as before a completion message is provided back to the host 402 for data operations, offloaded operations, SAN control operations, etc., or where a best effort is implemented for replication error handling operations). The synchronous replication relationship may be specified at a relatively fine level of granularity, such as on a per file or LUN basis.

In an example, a data operation 404 may be received by the first storage controller 406, as illustrated in FIG. 4A. FIG. 4B illustrates the data operation 404 being implemented in parallel by the first storage controller 406 and the second storage controller 412. For example, the data operation 404 may be locally implemented 422 by the first storage controller 406. The data operation 404 may be replicated 420 to the second storage controller 412 as a replication data operation that is remotely implemented 424 by the second storage controller 412. In an example, the local implementation 422 of the data operation 404 and the remote implementation 424 of the replication data operation may be performed in parallel (e.g., the replication data operation may be sent to the second storage controller 412 for remote implementation 424 regardless of whether the local implementation 422 is complete or not). Once the local implementation 422 completes 430 and the remote implementation completes 432, a data operation complete notification 450 may be sent to the host 402, as illustrated in FIG. 4C.

Figure 5A:
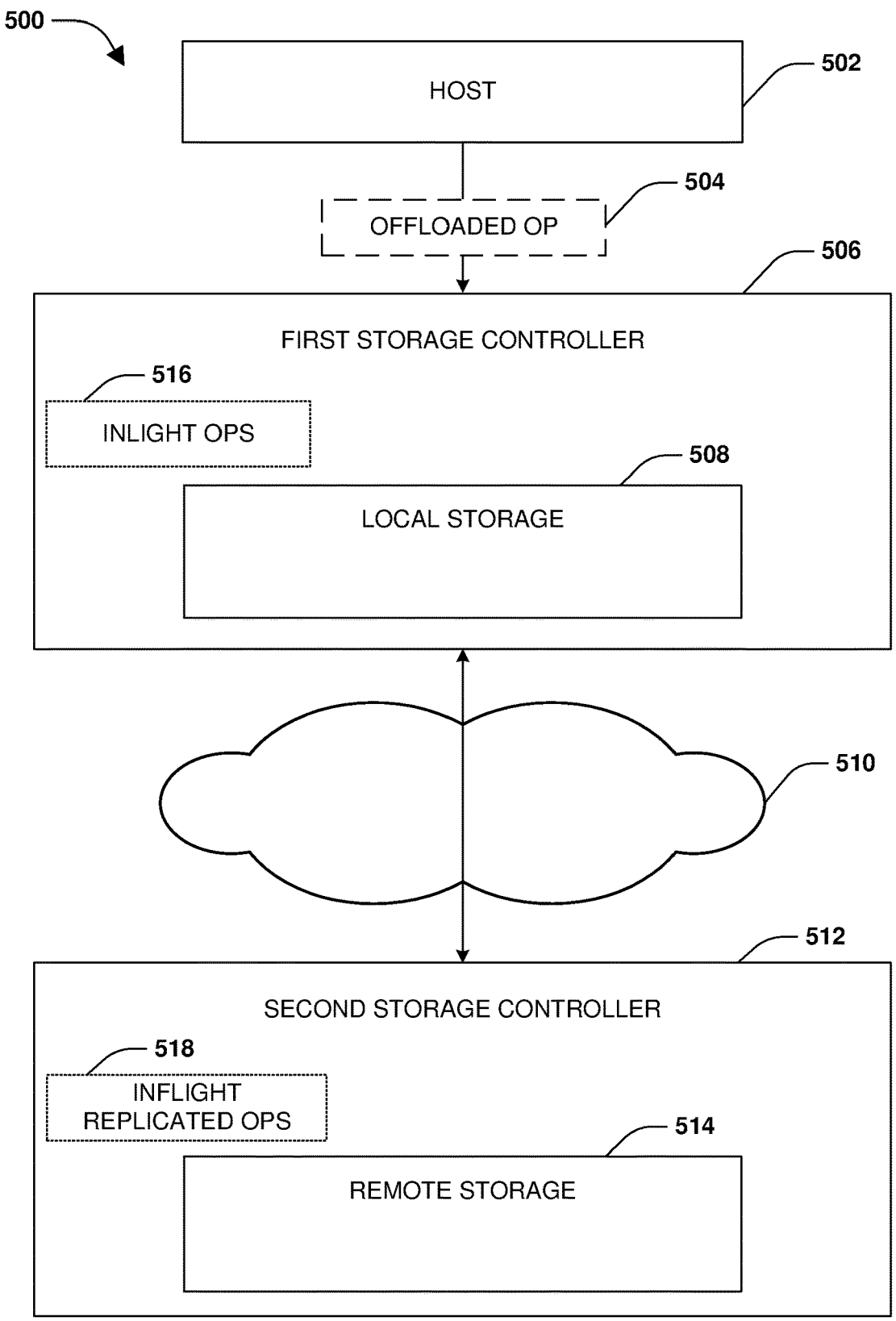
FIG. 5A is a component block diagram illustrating an exemplary computing device for synchronous replication, where an offloaded operation is received.
Figure 5B:
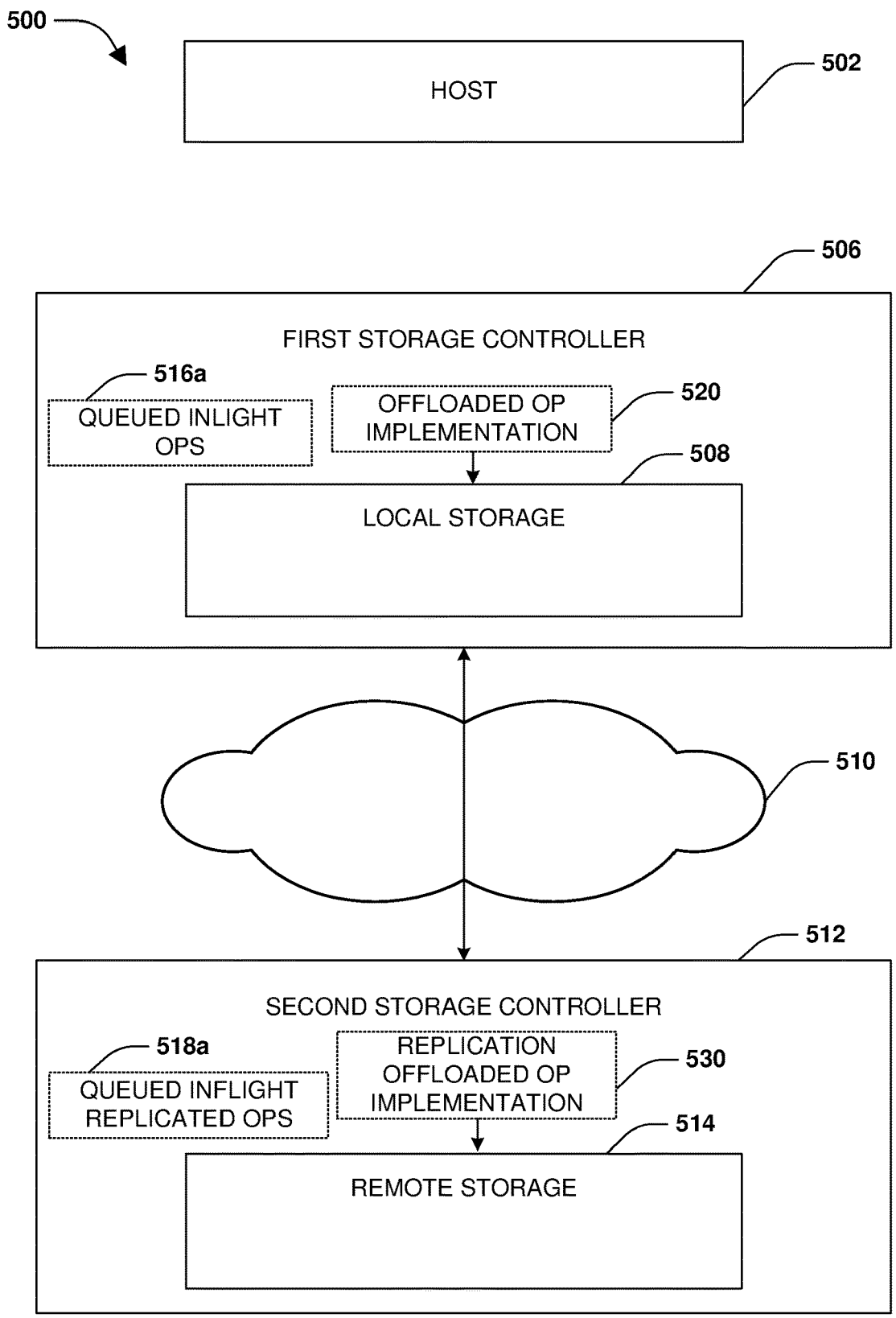
FIG. 5B is a component block diagram illustrating an exemplary computing device for synchronous replication, where an offloaded operation is locally implemented and a replication offloaded operation is remotely implemented in parallel.
Figure 5C:
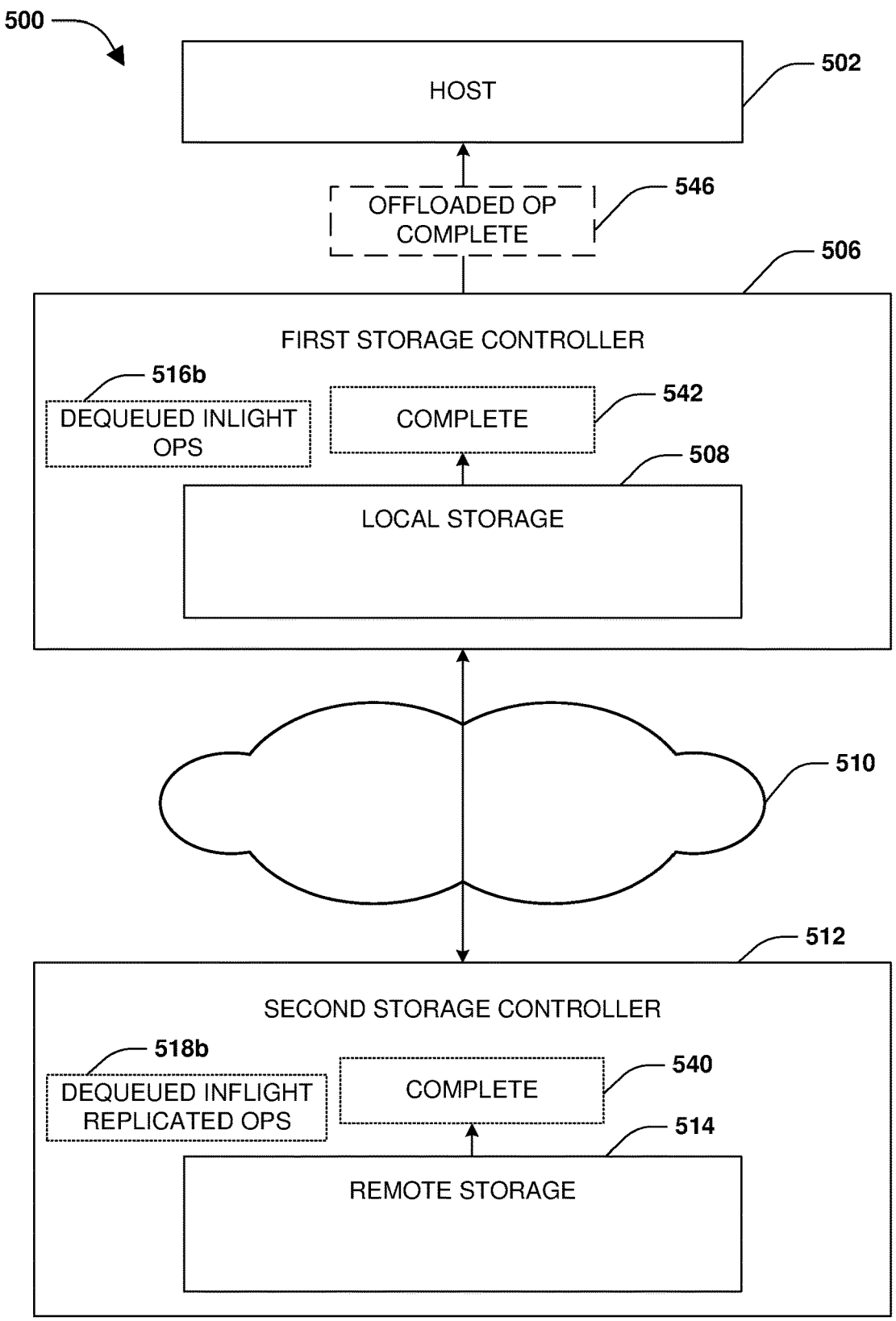
FIG. 5C is a component block diagram illustrating an exemplary computing device for synchronous replication, where an offloaded operation complete notification is provided to a host.

FIGS. 5A-5C illustrate examples of a network storage environment for which synchronous replication may be implemented by a system 500. A first storage controller 506 (e.g., hosted within a first storage cluster located within a first location) may be configured to provide a host 502 with access to data stored within local storage 508, as illustrated in FIG. 5A. The first storage controller 506 may be capable of communicating with a second storage controller 512 (e.g., hosted within a second storage cluster located within a second location) over a network 510.

The first storage controller 506 and the second storage controller 512 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the first storage controller 506 and the second storage controller 512, such as between the local storage 508 and the remote storage 514. The synchronous replication relationship may specify that data operations, offloaded operations, error handling operations, storage area network (SAN) control operations, and/or other types of operations for the local storage 508 are to be implemented at both the local storage 508 and replicated to the remote storage 514. The synchronous replication relationship may be specified at a relatively fine level of granularity, such as on a per LUN basis.

In an example, an offloaded operation 504 may be received by the first storage controller 506, as illustrated in FIG. 5A. For example, an application server may offload a copy operation as a copy offload operation to the first storage controller 506 (e.g., a storage server) for implementation upon the local storage 508. The offloaded operation 504 may be split into a replication offloaded operation because the offloaded operation 504 will result in a modification to data and/or metadata and thus should be replicated to the remote storage 514 for consistency. The offloaded operation 504 may be serialized with inflight operations 516 being implemented by the first storage controller 506 for the local storage 508, and the replication offloaded operation may be serialized with inflight replication operations being implemented by the second storage controller 512 for the remote storage 514. Accordingly, the inflight operations 516 may be queued as queued inflight operations 516a until the offloaded operation 504 is complete, as illustrated in FIG. 5B. In an example, the inflight replication operations 518 (e.g., that overlap offloaded operations and/or replication offloaded operations) may be secondarily queued as queued inflight replication operations 518a until the replication offloaded operation is complete, which may be beneficial for networks of higher latency. In another example, inflight operations 516 are queued by the first storage controller 506, but the inflight replication operations 518 are not queued by the second storage controller 512.

The offloaded operation 504 may be locally implemented 520 by the first storage controller 506 upon the local storage 508 in parallel with remote implementation 530 of the replication offloaded operation by the second storage controller 512 upon the remote storage 514. FIG. 5C illustrates the first storage controller 506 generating a completion notification 542 for the local implementation 520 of the offloaded operation 504 upon the local storage 508. The second storage controller 512 may generate a second completion notification 540 for the remote implementation 530 of the replicated offloaded operation upon the remote storage 514. In an example, the offloaded operation is optimized at the second storage controller in the same manner as optimization occurs at first storage controller, such that efficiency is achieved in a similar manner between the first and second storage controllers. The result being highly efficient offloaded operations regardless of the replication mechanism.

In this way, the remote storage 514 may mirror the local storage 508 based upon the local implementation 520 of the offloaded operation 504 upon the local storage 508 and the remote implementation 530 of the replication offloaded operation upon the remote storage 514. Once the offloaded operation 504 and the replication offloaded operation complete, an offloaded operation complete notification 546 may be sent to the host 502 (e.g., an application server that offloaded the copy operation or a client that issued the copy operation). The queued inflight operations 516a and the queued inflight replication operations 518a may be dequeued for implementation as dequeued inflight operations 516b and dequeued inflight replication operations 518b.

Figure 6A:
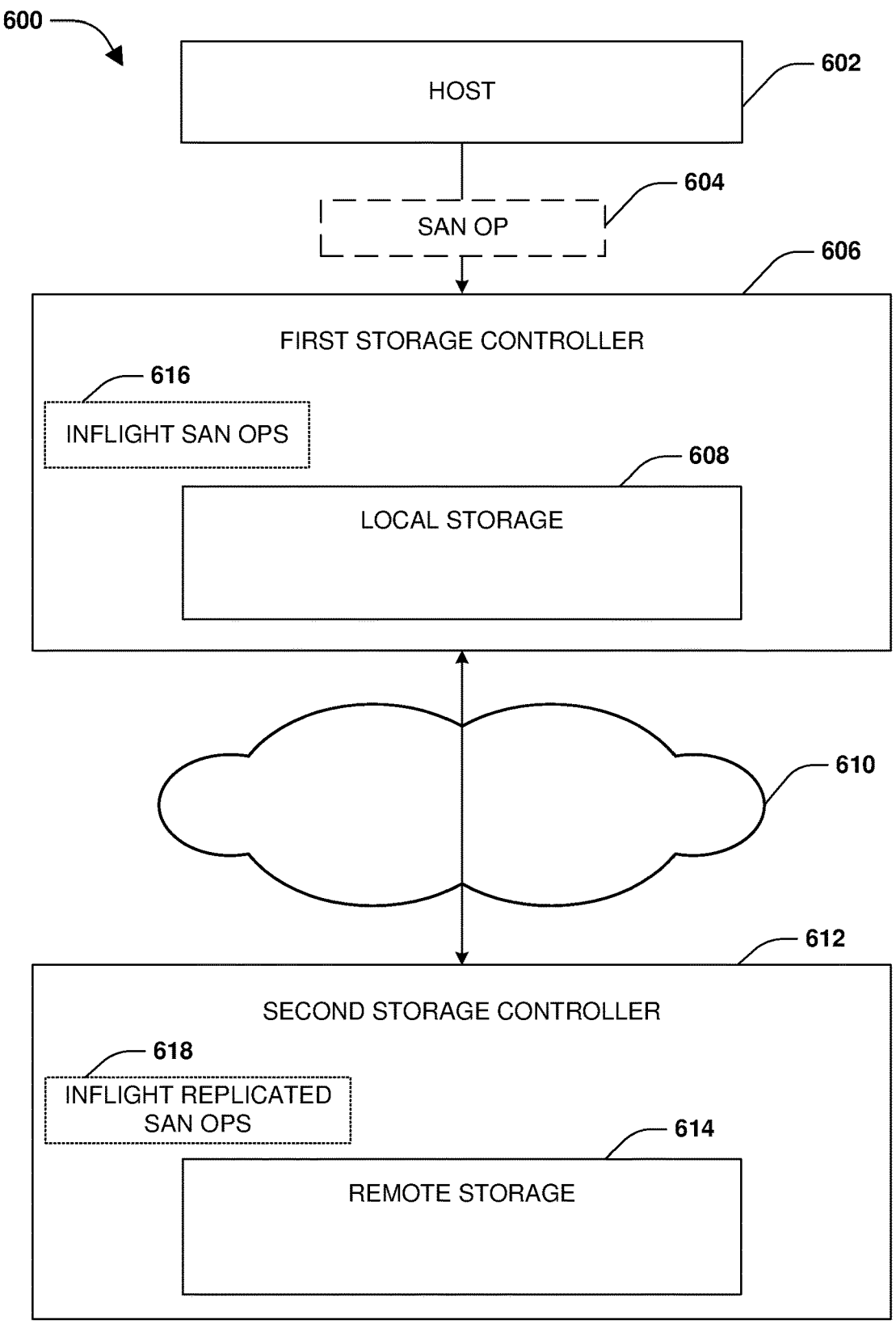
FIG. 6A is a component block diagram illustrating an exemplary computing device for synchronous replication, where a storage area network operation is received.

FIGS. 6A-6F illustrate examples of a network storage environment for which synchronous replication may be implemented by a system 600. A first storage controller 606 (e.g., hosted within a first storage cluster located within a first location) may be configured to provide a host 602 with access to data stored within local storage 608, as illustrated in FIG. 6A. The first storage controller 606 may be capable of communicating with a second storage controller 612 (e.g., hosted within a second storage cluster located within a second location) over a network 610.

The first storage controller 606 and the second storage controller 612 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the first storage controller 606 and the second storage controller 612, such as between the local storage 608 and the remote storage 614. The synchronous replication relationship may specify that data operations, offloaded operations, error handling operations, storage area network (SAN) control operations, and/or other types of operations for the local storage 608 are to be implemented at both the local storage 608 and replicated to the remote storage 614. The synchronous replication relationship may be specified at a relatively fine level of granularity, such as on a per file or LUN basis.

Figure 6B:
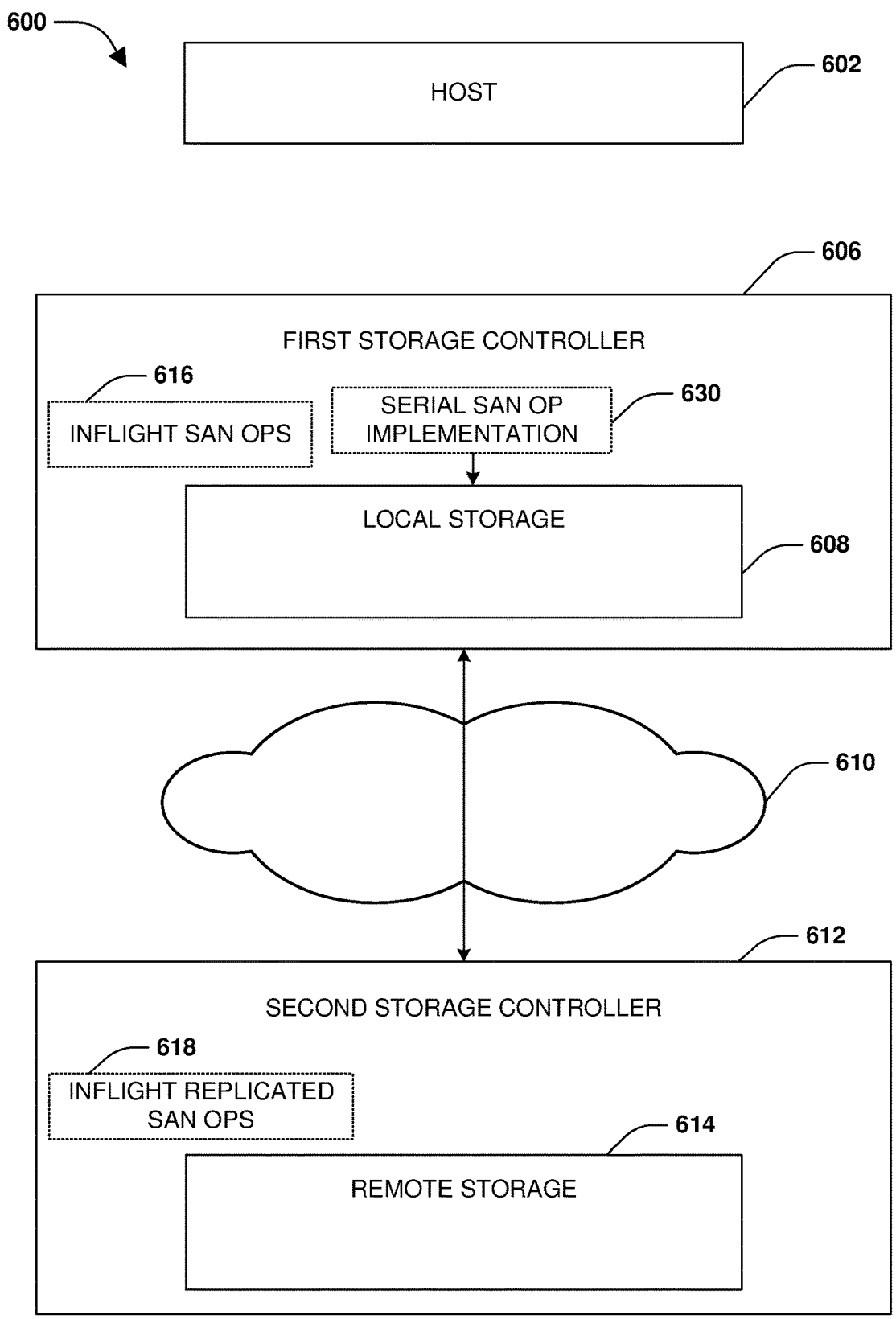
FIG. 6B is a component block diagram illustrating an exemplary computing device for synchronous replication, where a storage area network operation is locally implemented.
Figure 6C:
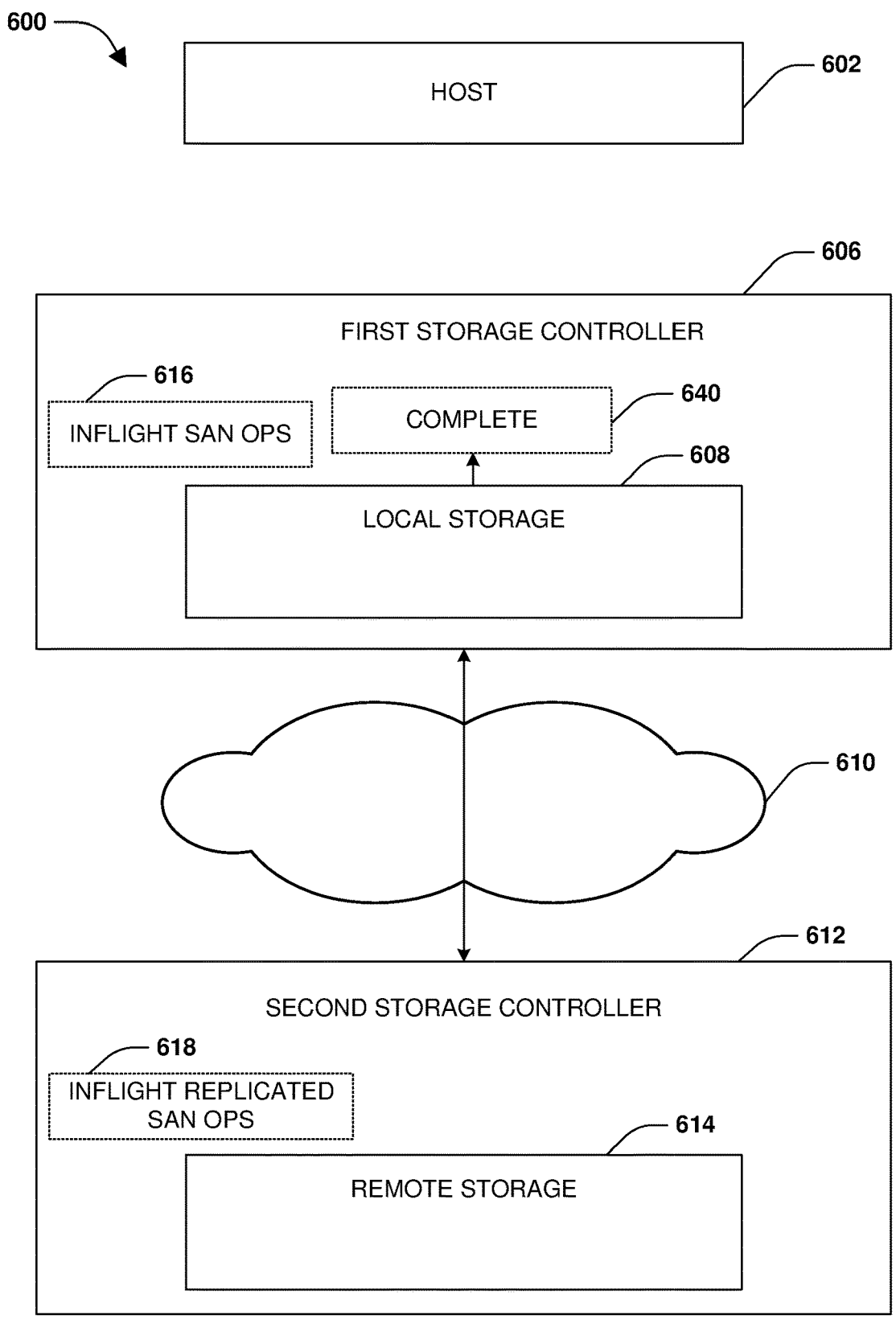
FIG. 6C is a component block diagram illustrating an exemplary computing device for synchronous replication, where local implementation of a storage area network operation is completed.

In an example, a storage area network (SAN) control operation 604 may be received by the first storage controller 606, as illustrated in FIG. 6A. The SAN control operation 604 may be split into a replication SAN control operation because the SAN control operation 604 will result in a modification to storage object metadata, such as LUN metadata, and thus should be replicated to the remote storage 614 for consistency. The SAN control operation 604 may be locally implemented 630 in a serial manner with other inflight SAN control operations 616 that target the same storage object, such as the same LUN. In this way, no more than one SAN control operation may be implemented for a LUN at any given time, as illustrated in FIG. 6B. FIG. 6C illustrates the first storage controller 606 generating a completion notification 640 for the local implementation 630 of the SAN control operation 604 upon the local storage 608.

Figure 6D:
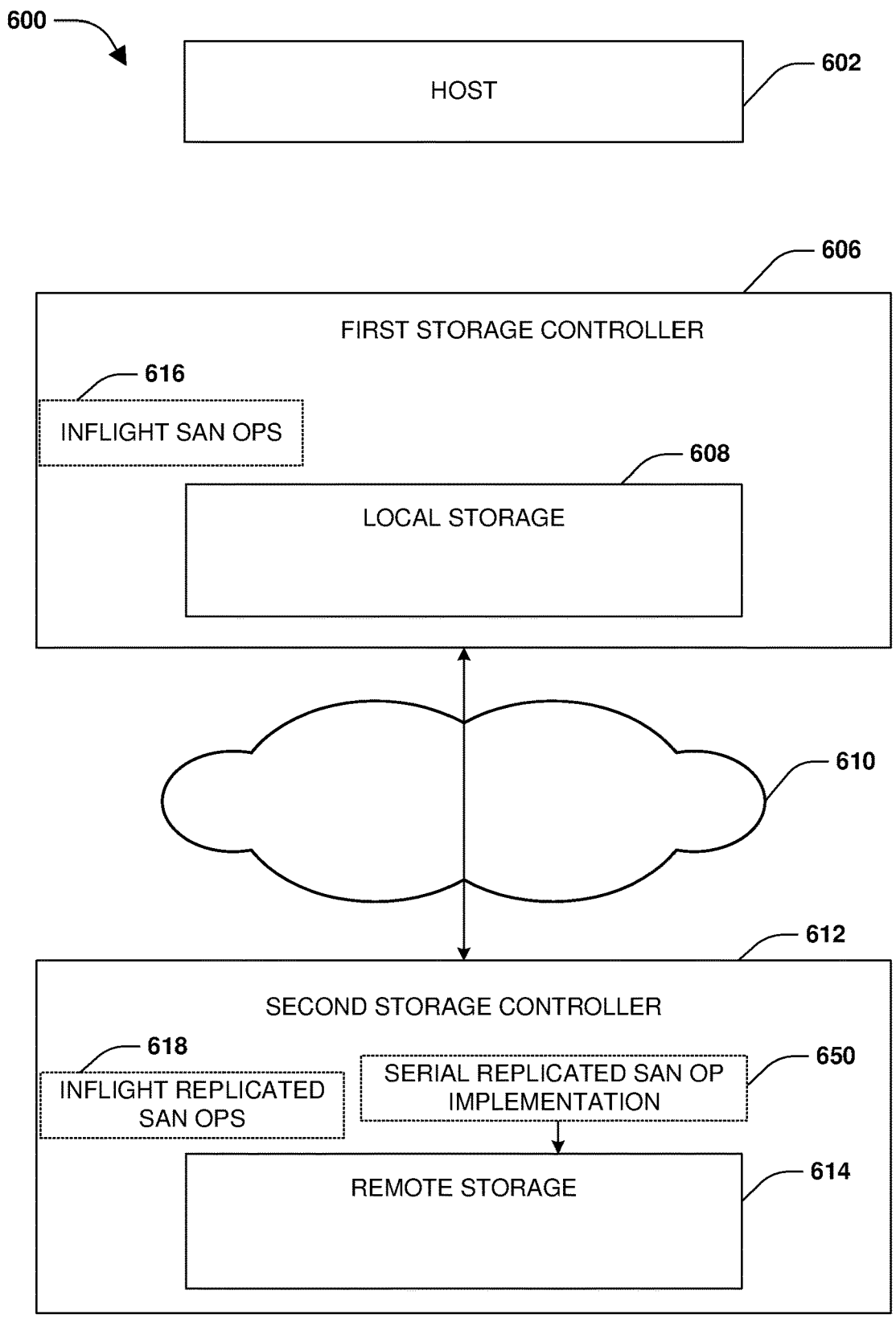
FIG. 6D is a component block diagram illustrating an exemplary computing device for synchronous replication, where a replication storage area network operation is remotely implemented.
Figure 6E:
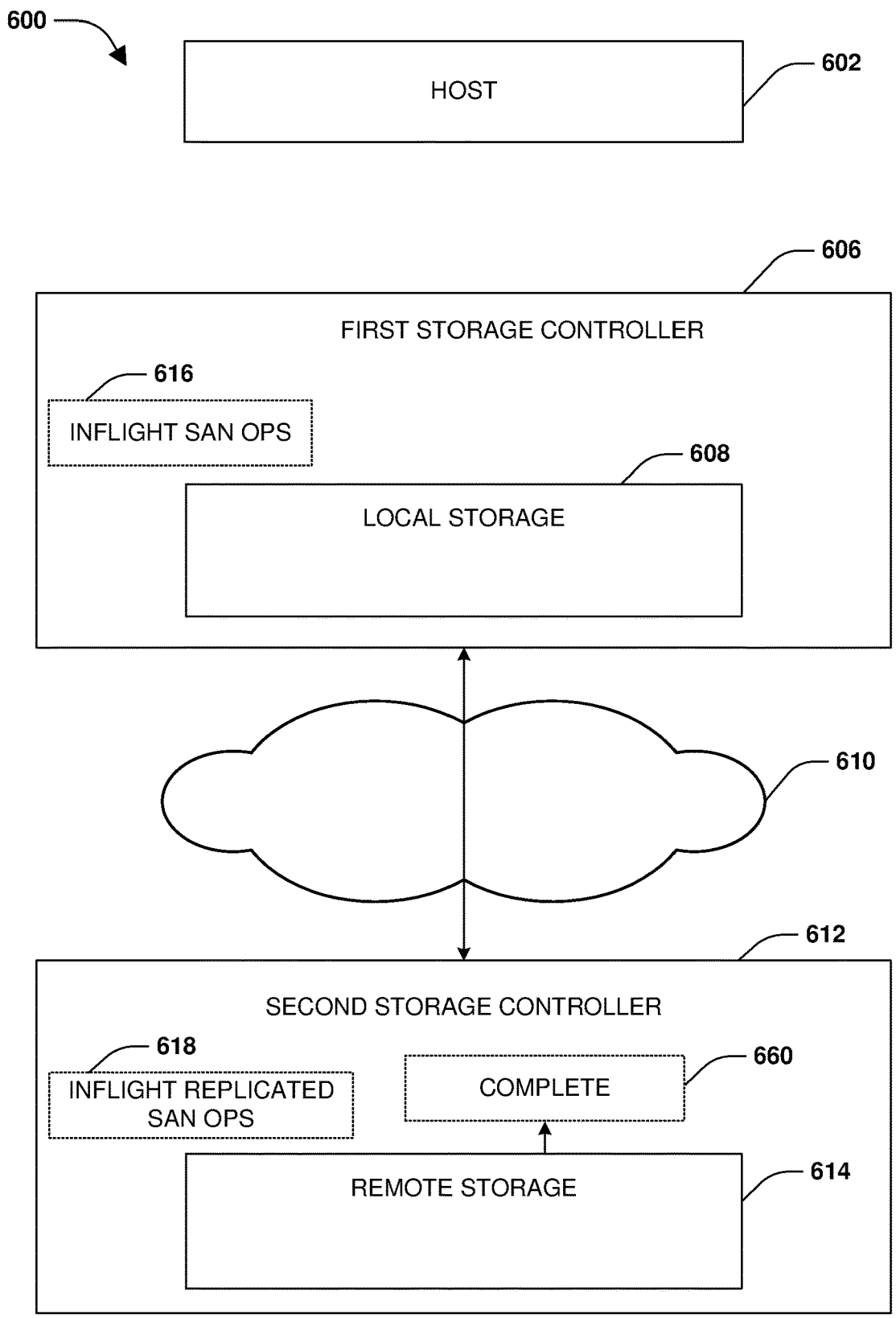
FIG. 6E is a component block diagram illustrating an exemplary computing device for synchronous replication, where remote implementation of a replication storage area network operation is completed.
Figure 6F:
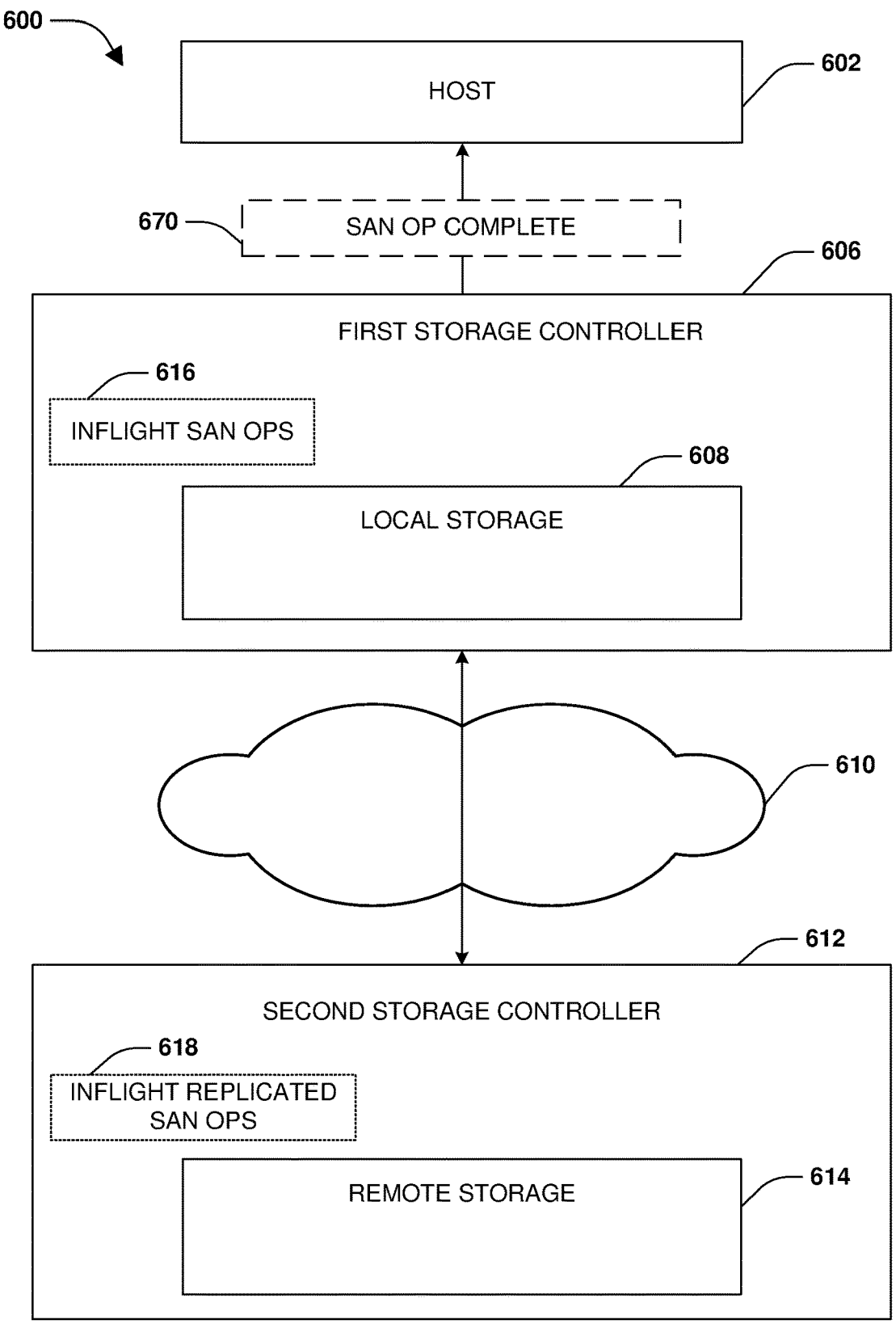
FIG. 6F is a component block diagram illustrating an exemplary computing device for synchronous replication, where a storage area network operation complete notification is provided to a host.

Responsive to receiving the completion notification 640 for the local implementation 630 of the SAN control operation 604, the replication SAN control operation may be remotely implemented 650 in a serial manner with other inflight replication SAN control operations 618 that target the same storage object, as illustrated in FIG. 6D. For example, the replication SAN control operation may not be implemented and/or sent to the second storage controller 612 until the SAN control operation 604 completes. The second storage controller 612 may generate a second completion notification 660 for the remote implementation 650 of the replication SAN control operation upon the remote storage 614, as illustrated in FIG. 6E. In this way, the remote storage 614 may mirror the local storage 608 based upon the local implementation 630 of the SAN control operation 604 upon the local storage 608 and the remote implementation 650 of the replication SAN control operation upon the remote storage 614. Once the SAN control operation 604 and the replication SAN control operation complete, an SAN control operation complete notification 670 may be sent to the host 602, as illustrated in FIG. 6F.

Figure 7A:
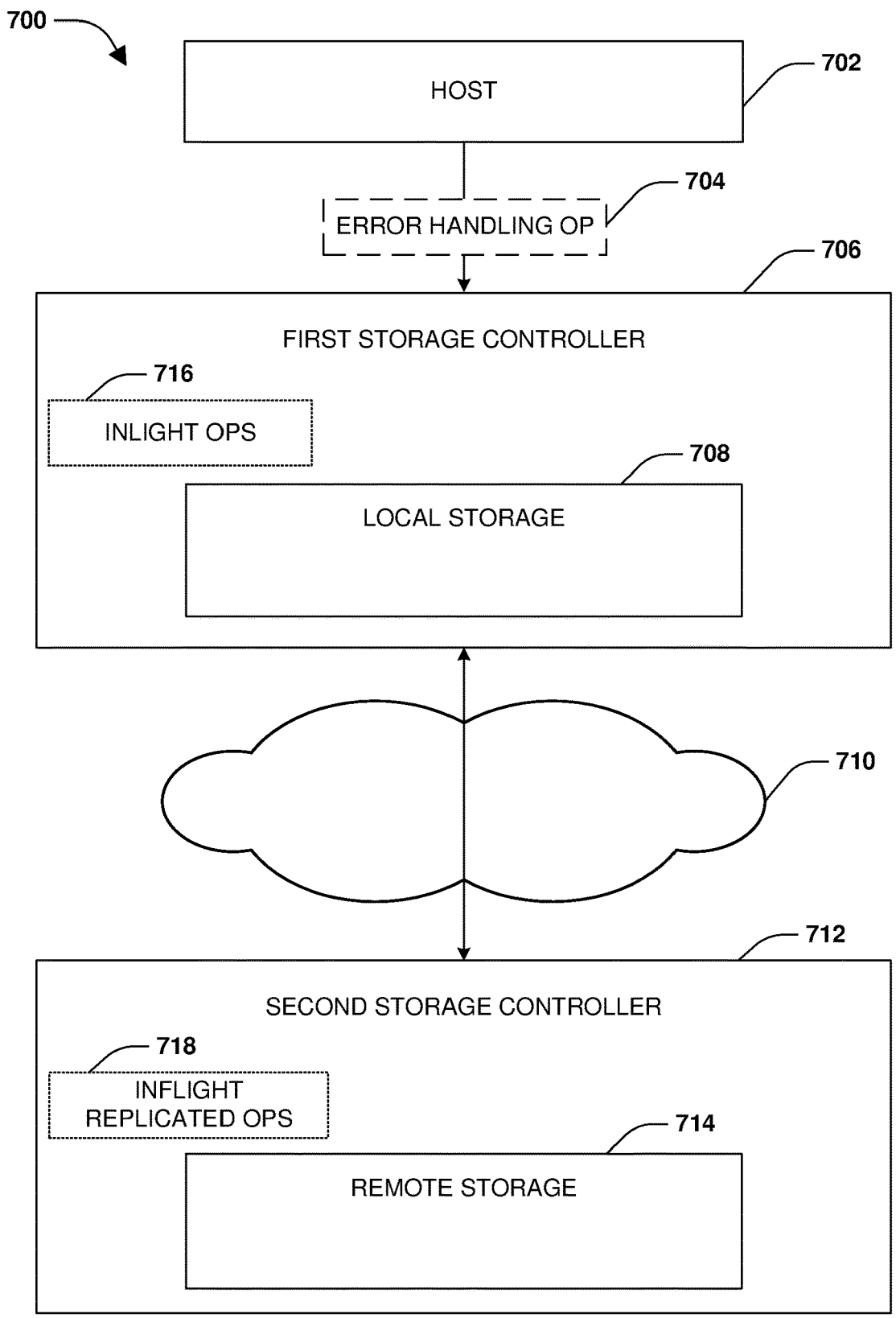
FIG. 7A is a component block diagram illustrating an exemplary computing device for synchronous replication, where an error handling operation is received.

FIGS. 7A-7D illustrate examples of a network storage environment for which synchronous replication may be implemented by a system 700. A first storage controller 706 (e.g., hosted within a first storage cluster located within a first location) may be configured to provide a host 702 with access to data stored within local storage 708, as illustrated in FIG. 7A. The first storage controller 706 may be capable of communicating with a second storage controller 712 (e.g., hosted within a second storage cluster located within a second location) over a network 710.

The first storage controller 706 and the second storage controller 712 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the first storage controller 706 and the second storage controller 712, such as between the local storage 708 and the remote storage 714. The synchronous replication relationship may specify that data operations, offloaded operations, error handling operations, storage area network (SAN) control operations, and/or other types of operations for the local storage 708 are to be implemented at both the local storage 708 and replicated to the remote storage 714. The synchronous replication relationship may be specified at a relatively fine level of granularity, such as on a per file or LUN basis.

Figure 7B:
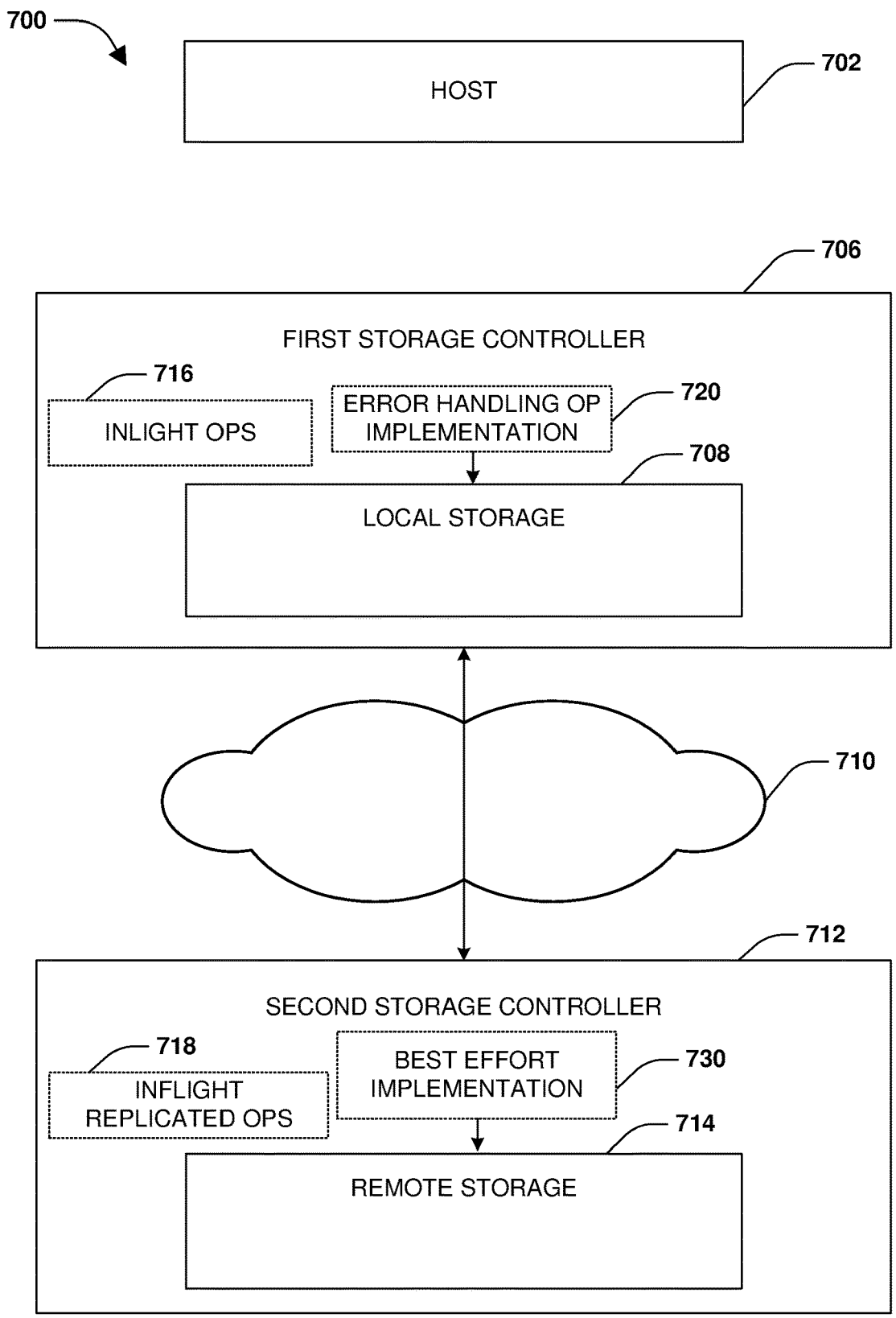
FIG. 7B is a component block diagram illustrating an exemplary computing device for synchronous replication, where an error handling operation is locally implemented and a replication error handling operation is remotely implemented as a best effort and in parallel with the error handling operation.

In an example, an error handling operation 704 may be received by the first storage controller 706, as illustrated in FIG. 7A. The error handling operation 704 may be split into a replication error handling operation because the error handling operation 704 will result in a modification to data and/or metadata (e.g., an abort of data operations that would otherwise write data to the local storage 708) and thus should be replicated to the remote storage 714 for consistency. The error handling operation 704 may be locally implemented 720 by the first storage controller 706 upon the local storage 708 in a synchronous manner such that the error handling operation 704 may be performed within a different process, such as a different thread, than inflight operations 716 that may have led to the error handling operation 704 (e.g., failed data operations), which may mitigate a likelihood that the error handling operation 704 also fails, as illustrated in FIG. 7B. Replicating the error handling operation can reduce processing time at the second storage controller. That is, since the first storage controller is waiting for the second storage controller to finish, the erroring handling operation is replicated to cancel processing by the second storage controller so that the first storage controller is not held up waiting on the second storage controller to fully process an original operation or message.

Figure 7C:
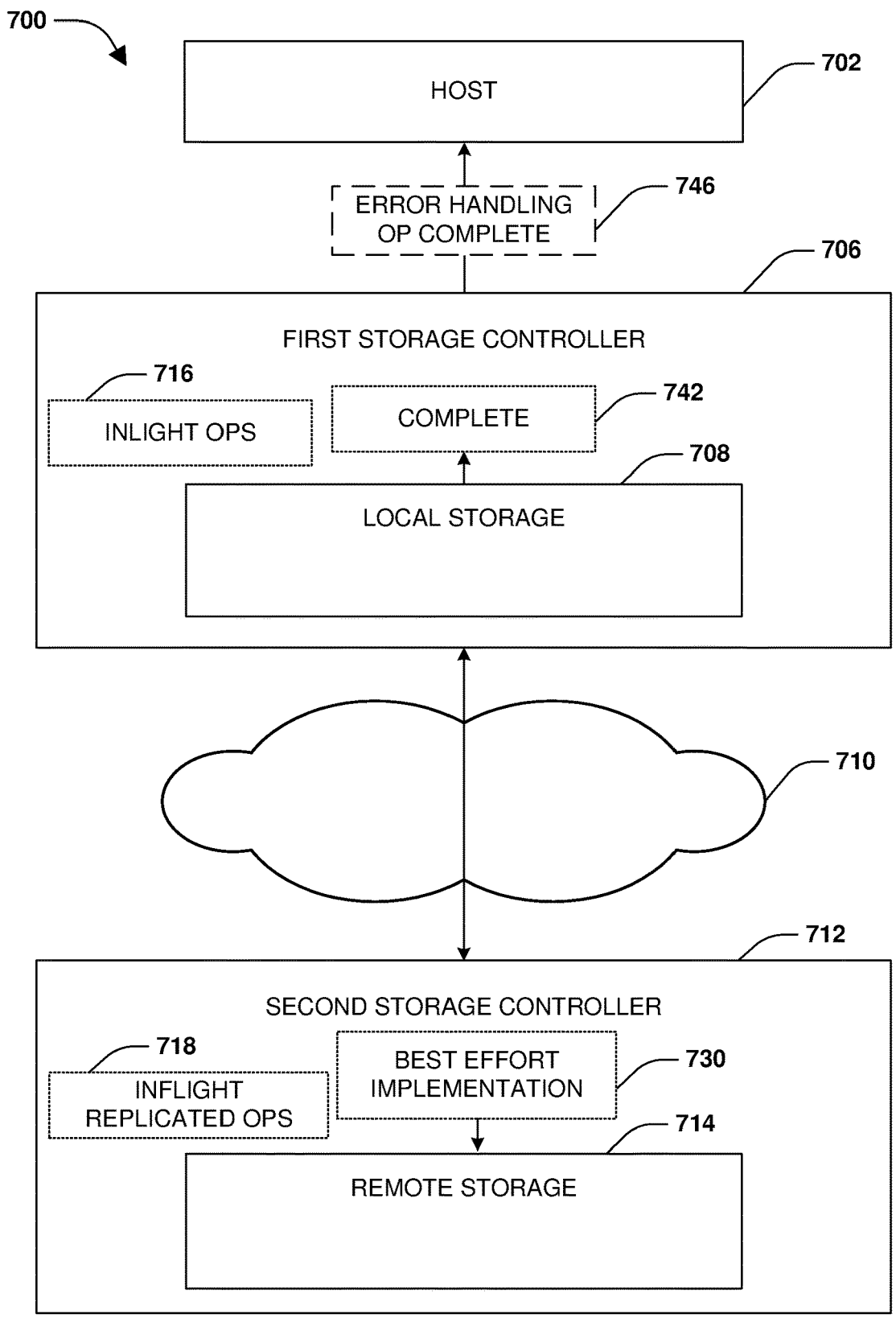
FIG. 7C is a component block diagram illustrating an exemplary computing device for synchronous replication, where an error handling operation success notification is provided to a host.

The replication error handling operation may be remotely implemented 730, such as in parallel with the local implementation 720 of the error handling operation 704 and synchronously with inflight replication operations 718 (e.g., implemented within a different process), by the second storage controller 712 upon the remote storage 714 as a best effort implementation. The best effort implementation may specify that success of the error handling operation 704 does not rely upon success of the replication error handling operation. For example, in response to first storage controller 706 generating a complete notification 742 for the local implementation 720 of the error handling operation 704, an error handling operation success notification 746 may be sent to the host 702 regardless of whether the best effort of the remote implementation 730 of the replication error handling operation successfully completed, as illustrated in FIG. 7C.

Figure 7D:
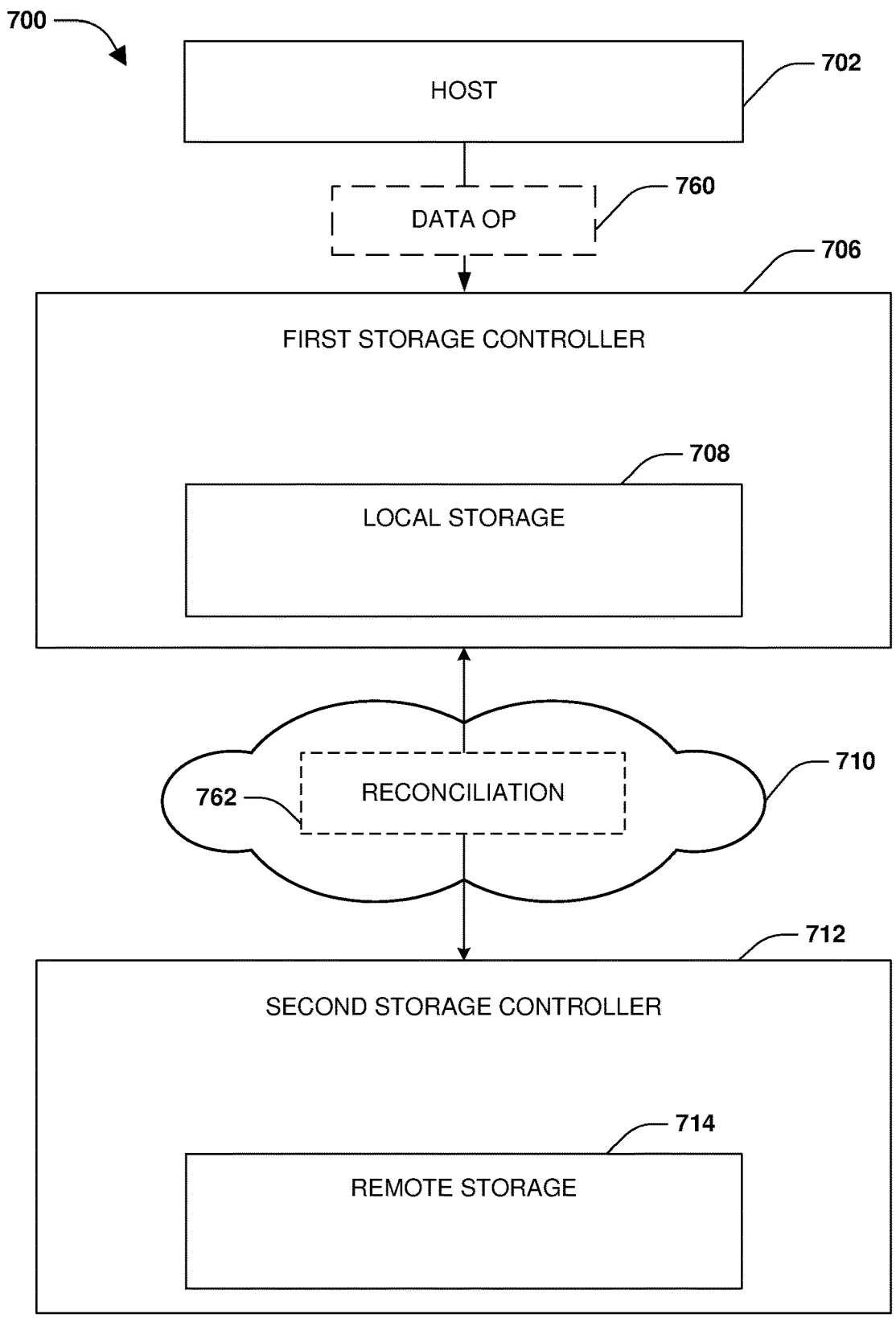
FIG. 7D is a component block diagram illustrating an exemplary computing device for synchronous replication, where a reconciliation between local storage and remote storage is performed.

FIG. 7D illustrates an example of performing a reconciliation 762 between the local storage 708 and the remote storage 714 because the replication error handling operation was implemented as a best effort. That is, because of parallel splitting of the error handling operation 704, an operation could complete on the local storage 708 and abort at the remote storage 714 or the operation could abort on the local storage 708 and complete on the remote storage 714, thus resulting in divergence between the local storage 708 and the remote storage 714. Accordingly, the reconciliation 762 may be performed to determine whether there is the divergence (e.g., if the data operation aborted at the local storage 708 and completed at the remote storage 714, then the reconciliation 762 may modify the remote storage 714 into a state corresponding to the local storage 708 where the data operation was aborted or may modify the local storage 708 into a state corresponding to the remote storage 714 where the data operation was completed). In an example, the reconciliation 762 may be performed in-line with a current data operation 760 (e.g., a read or write to a region affected by the data operation that may or may not have been aborted by the replication error handling operation).

Figure 8:
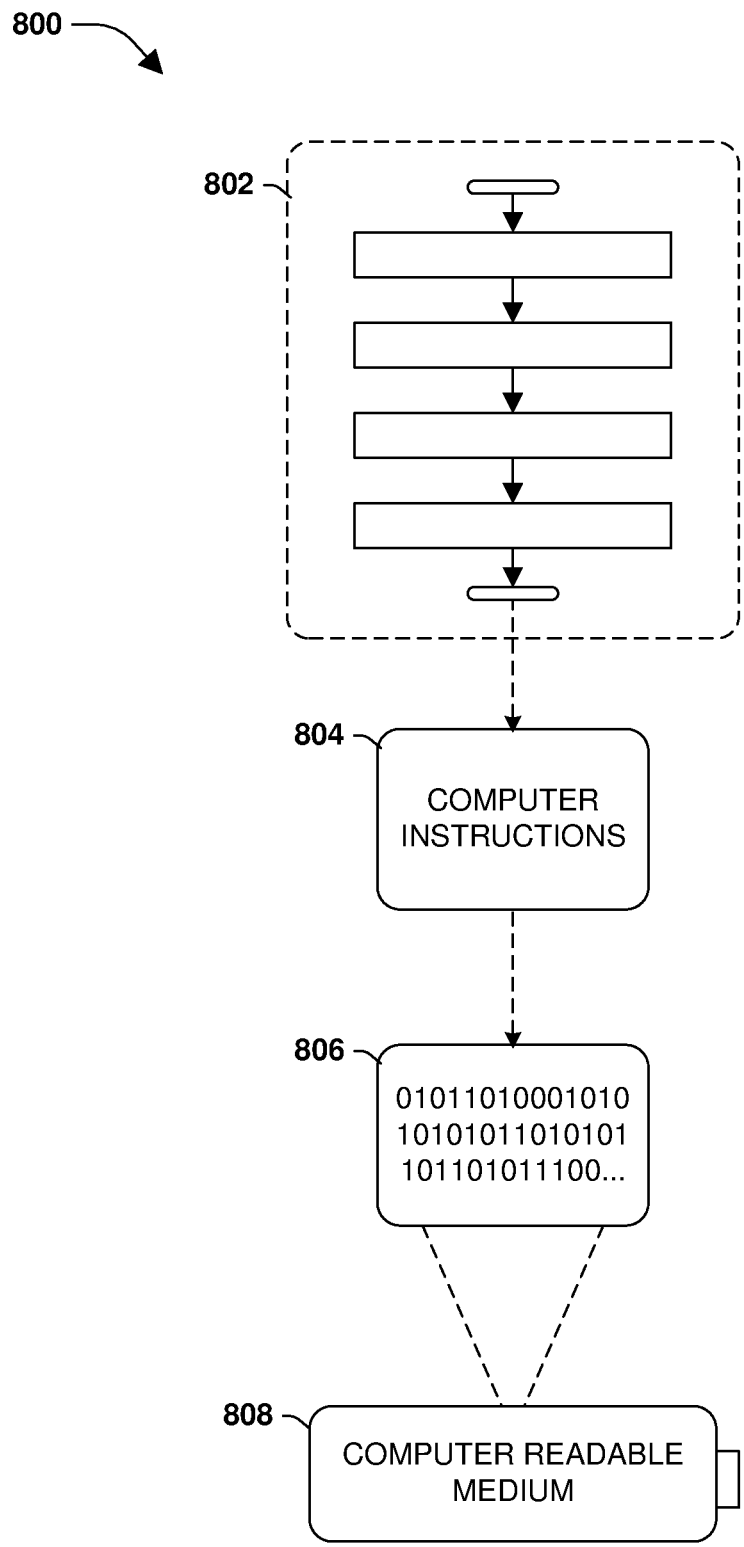
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-ft DVD-R, flash drive, a platter of a hard disk drive, etc., on which is encoded computer-readable data 806. This computer-readable data 806, such as binary data comprising at least one of a zero or a one, in turn comprises a processor-executable computer instructions 804 configured to operate according to one or more of the principles set forth herein. In some embodiments, the processor-executable computer instructions 804 are configured to perform a method 802, such as at least some of the exemplary method 300 of FIG. 3, for example. In some embodiments, the processor-executable computer instructions 804 are configured to implement a system, such as at least some of the exemplary system 400 of FIGS. 4A-4C, at least some of the exemplary system 500 of FIGS. 5A-5C, at least some of the exemplary system 600 of FIGS. 6A-6F, and/or at least some of the exemplary system 700 of FIGS. 7A-7D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium comprising instructions for performing a method, which when executed by a machine, causes the machine to:
   maintain a set of hash tables to track data operations that are inflight;
   receive a data operation targeting a first storage object;
   tag the data operation with an identifier of a hash table of the set of hash tables; and
   search the hash table to identify information related to the data operation based upon the identifier with which the data operation is tagged.

2. The non-transitory machine readable medium of claim 1, wherein the instructions cause the machine to:
   tag a replication data operation with the identifier of the hash table, wherein the replication data operation is a replica of the data operation; and
   search the hash table to identify information related to the replication data operation based upon the identifier with which the replication data operation is tagged.

3. The non-transitory machine readable medium of claim 1, wherein the instructions cause the machine to:
   tag a replication data operation with the identifier of the hash table, wherein the replication data operation is a replica of the data operation; and
   search the hash table to identify information related to the replication data operation and the data operation based upon the identifier with which the replication data operation and the data operation are tagged.

4. The non-transitory machine readable medium of claim 1, wherein the instructions cause the machine to:
   populate the hash table with information used to perform a reconciliation for at least one of the data operation or a replication data operation that is a replica of the data operation.

5. The non-transitory machine readable medium of claim 1, wherein the instructions cause the machine to:
   populate the hash table with information indicating whether data operation or a replication data operation that is a replica of the data operation succeeded or failed.

6. The non-transitory machine readable medium of claim 1, wherein the instructions cause the machine to:
   populate the hash table with information indicating a local region within local storage targeted by the data operation and a remote region within remote storage targeted by a replication data operation that is a replica of the data operation; and
   evaluate the local region and the remote region for data consistency.

7. A method comprising:
   maintaining a set of hash tables to track data operations that are inflight;
   receiving a data operation targeting a first storage object;
   tagging the data operation with an identifier of a hash table of the set of hash tables; and
   searching the hash table to identify information related to the data operation based upon the identifier with which the data operation is tagged.

8. The method of claim 7, comprising:
   tagging a replication data operation with the identifier of the hash table, wherein the replication data operation is a replica of the data operation; and
   searching the hash table to identify information related to the replication data operation based upon the identifier with which the replication data operation is tagged.

9. The method of claim 7, comprising:
   tagging a replication data operation with the identifier of the hash table, wherein the replication data operation is a replica of the data operation; and
   searching the hash table to identify information related to the replication data operation and the data operation based upon the identifier with which the replication data operation and the data operation are tagged.

10. The method of claim 7, comprising:
populating the hash table with information used to perform a reconciliation for at least one of the data operation or a replication data operation that is a replica of the data operation.

11. The method of claim 7, comprising:
populating the hash table with information indicating whether data operation or a replication data operation that is a replica of the data operation succeeded or failed.

12. The method of claim 7, comprising:
populating the hash table with information indicating a local region within local storage targeted by the data operation and a remote region within remote storage targeted by a replication data operation that is a replica of the data operation; and
evaluating the local region and the remote region for data consistency.

13. The method of claim 7, comprising:
tagging a replication data operation with the identifier of the hash table, wherein the replication data operation is a replica of the data operation.

14. A computing device comprising:
a memory comprising machine executable code; and
a processor coupled to the memory, the processor configured to execute the machine executable code to cause the processor to perform operations comprising:
maintaining a set of hash tables to track data operations that are inflight;
receiving a data operation targeting a first storage object;
tagging the data operation with an identifier of a hash table of the set of hash tables; and
searching the hash table to identify information related to the data operation based upon the identifier with which the data operation is tagged.

15. The computing device of claim 14, the operations comprising:
tagging a replication data operation with the identifier of the hash table, wherein the replication data operation is a replica of the data operation; and
searching the hash table to identify information related to the replication data operation based upon the identifier with which the replication data operation is tagged.

16. The computing device of claim 14, the operations comprising:
tagging a replication data operation with the identifier of the hash table, wherein the replication data operation is a replica of the data operation; and
searching the hash table to identify information related to the replication data operation and the data operation based upon the identifier with which the replication data operation and the data operation are tagged.

17. The computing device of claim 14, the operations comprising:
populating the hash table with information used to perform a reconciliation for at least one of the data operation or a replication data operation that is a replica of the data operation.

18. The computing device of claim 14, the operations comprising:
populating the hash table with information indicating whether data operation or a replication data operation that is a replica of the data operation succeeded or failed.

19. The computing device of claim 14, the operations comprising:
populating the hash table with information indicating a local region within local storage targeted by the data operation and a remote region within remote storage targeted by a replication data operation that is a replica of the data operation; and
evaluating the local region and the remote region for data consistency.

20. The computing device of claim 14, the operations comprising:
tagging a replication data operation with the identifier of the hash table, wherein the replication data operation is a replica of the data operation.

* * * * *